(12) United States Patent
Morita

(10) Patent No.: US 12,198,739 B2
(45) Date of Patent: Jan. 14, 2025

(54) SERVO WRITER AND CARTRIDGE

(71) Applicant: Sony Group Corporation, Tokyo (JP)

(72) Inventor: Hiroshi Morita, Tokyo (JP)

(73) Assignee: Sony Group Corporation, Tokyo (JP)

( * ) Notice: Subject to any disclaimer, the term of this patent is extended or adjusted under 35 U.S.C. 154(b) by 261 days.

(21) Appl. No.: 17/775,667

(22) PCT Filed: Nov. 10, 2020

(86) PCT No.: PCT/JP2020/041893
§ 371 (c)(1),
(2) Date: May 10, 2022

(87) PCT Pub. No.: WO2021/095720
PCT Pub. Date: May 20, 2021

(65) Prior Publication Data
US 2022/0406335 A1    Dec. 22, 2022

(30) Foreign Application Priority Data
Nov. 12, 2019  (JP) .................................. 2019-204740

(51) Int. Cl.
*G11B 5/592*       (2006.01)
*G11B 5/706*       (2006.01)
(Continued)

(52) U.S. Cl.
CPC ........ *G11B 5/5928* (2013.01); *G11B 5/70678* (2013.01); *G11B 5/78* (2013.01); *G11B 21/103* (2013.01); *G11B 23/107* (2013.01)

(58) Field of Classification Search
None
See application file for complete search history.

(56) References Cited

U.S. PATENT DOCUMENTS 5,587,789 A * 12/1996 Lee .................... G11B 27/32
10,242,709 B1 * 3/2019 Yamamoto ......... G11B 20/1876
(Continued)

FOREIGN PATENT DOCUMENTS

| JP | H0676259 A | 3/1994 |
|---|---|---|
| JP | H11260034 A | 9/1999 |

(Continued)

OTHER PUBLICATIONS

International Search Report from corresponding PCT application PCT/JP2020/041893, dated Feb. 9, 2021.

*Primary Examiner* — Fred Tzeng
(74) *Attorney, Agent, or Firm* — K&L Gates LLP

(57) ABSTRACT

A servo writer includes a running unit that sends a tape-like magnetic recording medium out from a cartridge, winds up the sent out magnetic recording medium, and runs the magnetic recording medium; an erasing unit that erases a first servo pattern formed in the magnetic recording medium that runs; a head that writes a servo signal in the running magnetic recording medium from which the first servo pattern is erased and forms a second servo pattern; and a control unit that controls the head so that the servo signal is written in at least one period of an accelerated running period and a decelerated running period of the magnetic recording medium, and forms the second servo pattern that does not satisfy a standard in the magnetic recording medium.

9 Claims, 11 Drawing Sheets

(51) Int. Cl.
*G11B 5/78* (2006.01)
*G11B 21/10* (2006.01)
*G11B 23/107* (2006.01)

(56) References Cited

U.S. PATENT DOCUMENTS

| | | | |
|---|---|---|---|
| 2008/0239556 A1 | 10/2008 | Wiseman et al. | |
| 2011/0051277 A1* | 3/2011 | Bradshaw | G11B 5/024 |
| 2011/0205657 A1 | 8/2011 | Cherubini et al. | |
| 2012/0019948 A1* | 1/2012 | Fasen | G11B 5/49 |
| 2012/0050908 A1* | 3/2012 | Ohtsu | G11B 5/584 |
| | | | 360/134 |
| 2012/0314319 A1* | 12/2012 | Olson | G11B 5/584 |
| 2013/0063836 A1* | 3/2013 | Bui | G11B 5/584 |
| 2017/0372744 A1* | 12/2017 | Ozawa | G11B 5/584 |
| 2019/0103133 A1* | 4/2019 | Ozawa | G11B 5/70678 |
| 2019/0139569 A1* | 5/2019 | Bui | G11B 5/0086 |
| 2020/0357434 A1* | 11/2020 | Yamaga | G11B 5/714 |
| 2020/0357437 A1* | 11/2020 | Yamaga | G11B 5/00813 |
| 2020/0402531 A1 | 12/2020 | Yamaga et al. | |
| 2020/0411042 A1 | 12/2020 | Yamaga et al. | |
| 2021/0012805 A1 | 1/2021 | Terakawa et al. | |
| 2021/0043224 A1 | 2/2021 | Endo | |
| 2021/0065741 A1* | 3/2021 | Nakao | G11B 5/265 |
| 2021/0110847 A1* | 4/2021 | Biskeborn | G11B 5/02 |
| 2021/0233567 A1* | 7/2021 | Tochikubo | G11B 15/43 |
| 2022/0172742 A1* | 6/2022 | Sekiguchi | G11B 23/107 |
| 2023/0343365 A1* | 10/2023 | Sekiguchi | G11B 5/714 |

FOREIGN PATENT DOCUMENTS

| | | |
|---|---|---|
| JP | 2004326852 A | 11/2004 |
| JP | 2006127730 A | 5/2006 |
| JP | 2008198277 A | 8/2008 |
| JP | 2008257840 A | 10/2008 |
| JP | 2010182411 A | 8/2010 |
| JP | 2013520762 A | 6/2013 |
| WO | 2019093469 A1 | 5/2019 |
| WO | 2019160144 A1 | 8/2019 |

* cited by examiner

Fig. 7
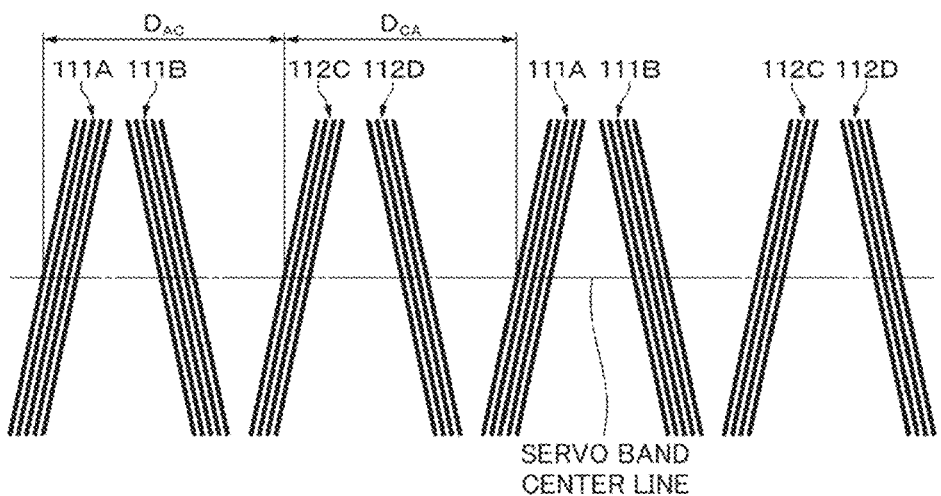
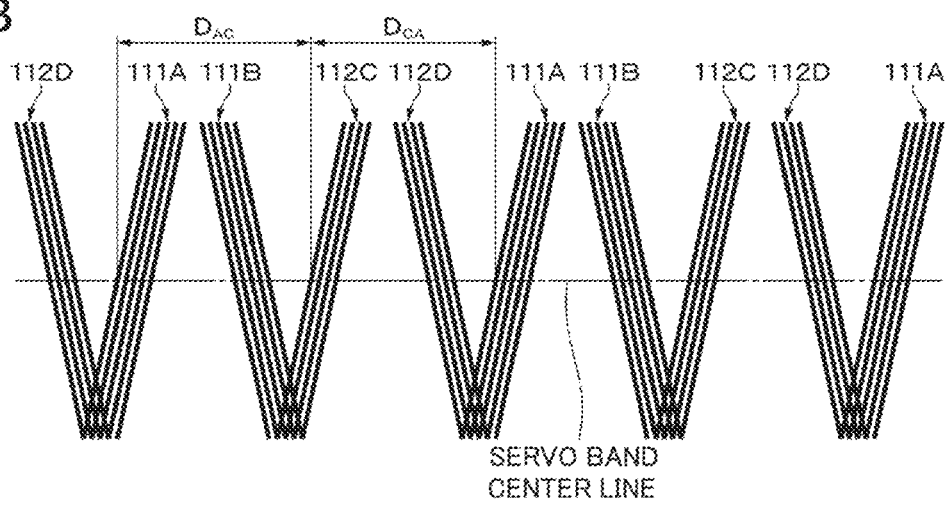
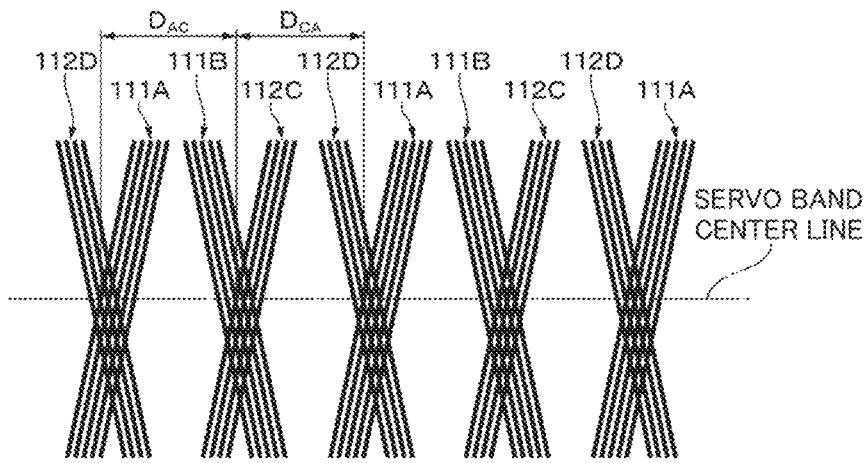

SERVO WRITER AND CARTRIDGE

TECHNICAL FIELD

The present disclosure relates to a servo writer and a cartridge.

BACKGROUND ART

In recent years, in a tape-like magnetic recording medium used as a computer data storage, a width of a data track and a distance between adjacent data tracks have become narrower in order improve a data recording density. When the width of the data track and the distance between adjacent data tracks are narrowed in this manner, it is difficult to trace the data track with a recording/reproducing element of a magnetic head.

Therefore, a technology in which a servo signal is written in advance in a magnetic recording medium, the servo signal is read by a magnetic head, and thus a position of a recording/reproducing element of a magnetic head in a width direction of the magnetic recording medium is servo-controlled has been proposed (for example, refer to PTL 1).

CITATION LIST

Patent Literature

[PTL 1]
    JP 2006-127730 A

SUMMARY

Technical Problem

A magnetic recording medium in which a servo signal is written is accommodated in a cartridge case, and shipped as a product after quality inspection of the magnetic recording medium is performed. In the related art, if the quality of the servo signal is found to be poor in the above quality inspection stage, the cartridge is discarded. Therefore, if the number of cartridges discarded is large, the productivity with respect to the cartridges deteriorates.

An object of the present disclosure is to provide a servo writer through which it is possible to reduce the number of cartridges discarded, and a cartridge in which a servo signal is recorded using the servo writer.

Solution to Problem

In order to address the above problem, the first disclosure provides a servo writer including a running unit that sends a tape-like magnetic recording medium out from a cartridge, winds up the sent out magnetic recording medium, and runs the magnetic recording medium; an erasing unit that erases a first servo pattern formed in the magnetic recording medium that runs; a head that writes a servo signal in the running magnetic recording medium from which the first servo pattern is erased and forms a second servo pattern; and a control unit that controls the head so that the servo signal is written in at least one period of an accelerated running period and a decelerated running period of the magnetic recording medium, and forms the second servo pattern that does not satisfy a standard in the magnetic recording medium.

The second disclosure provides a servo writer including a running unit that sends a tape-like magnetic recording medium out from a cartridge, winds up the sent out magnetic recording medium, and runs the magnetic recording medium; an erasing unit that erases a first servo pattern formed in the magnetic recording medium that runs; a head that writes a servo signal in the running magnetic recording medium from which the first servo pattern is erased and forms a second servo pattern; and a control unit that controls the head so that the servo signal is not written in at least one period of an accelerated running period and a decelerated running period of the magnetic recording medium.

The third disclosure provides a cartridge including a wound tape-like magnetic recording medium; and a case in which the magnetic recording medium is accommodated, wherein the magnetic recording medium has an unused area, and wherein, in the unused area, a servo pattern that does not satisfy a standard is formed or a servo pattern is not formed.

BRIEF DESCRIPTION OF DRAWINGS

FIG. 7A is a schematic diagram showing a first example of servo patterns that do not satisfy a standard.
FIG. 7B is a schematic diagram showing a second example of servo patterns that do not satisfy a standard.
FIG. 7C is a schematic diagram showing an example of servo patterns that satisfy a standard.

DESCRIPTION OF EMBODIMENTS

Figure 1:
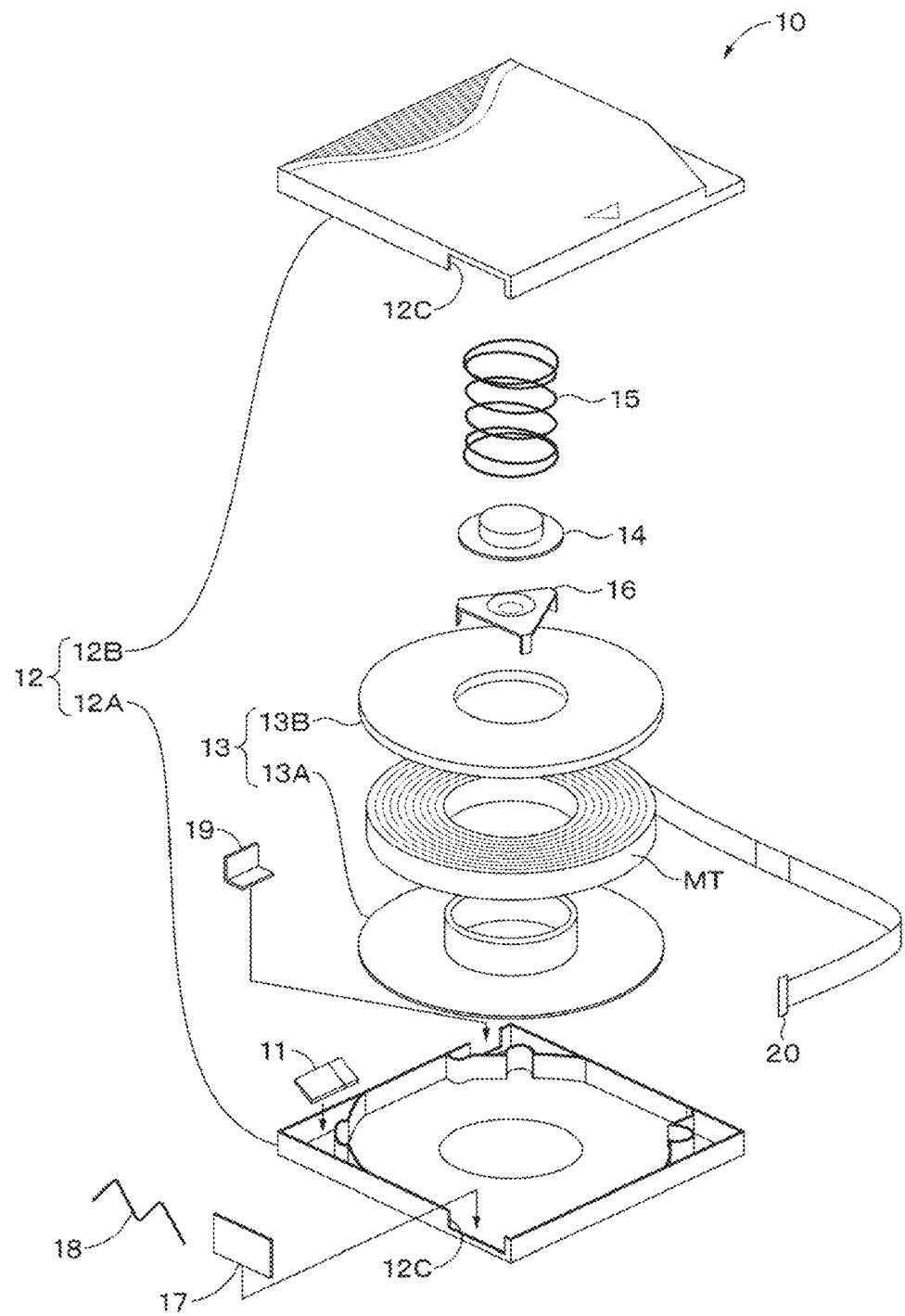
FIG. 1 is an exploded perspective view showing an example of a configuration of a cartridge.

Embodiments of the present disclosure will be described in the following order with reference to the drawings. Here, in all the drawings of the following embodiments, the same or corresponding parts will be denoted with the same reference numerals.
    1 Configuration of cartridge
    2 Configuration of magnetic tape
    3 Format of magnetic tape
    4 Configuration of servo writer for cartridge
    5 Operation of servo writer for cartridge
    6 Configuration of servo signal recording system
    7 Operation of servo signal recording system
    8 Effects
    9 Modification Examples

1 CONFIGURATION OF CARTRIDGE

FIG. 1 is an exploded perspective view showing an example of a configuration of a cartridge 10. The cartridge 10 is a magnetic tape cartridge according to the Linear Tape-Open (LTO) standard, and includes a reel 13 on which a magnetic tape (tape-like magnetic recording medium) MT is wound, a reel lock 14 and a reel spring 15 for locking rotation of the reel 13, a spider 16 for unlocking the reel 13, a slide door 17 that opens and closes a tape outlet 12C provided in the cartridge case 12 straddling the lower shell 12A and the upper shell 12B, a door spring 18 that biases the slide door 17 to the closed position of the tape outlet 12C, a write-protect 19 for preventing erroneous erasure, and a cartridge memory 11, in a cartridge case 12 composed of a lower shell 12A and an upper shell 12B. The reel 13 has a substantially disk shape having an opening in the center part, and is composed of a reel hub 13A made of a hard material such as a plastic and a flange 13B. A leader pin 20 is provided at one end of the magnetic tape MT.

The cartridge memory 11 is provided in the vicinity of one corner of the cartridge 10. When the cartridge 10 is loaded in a recording/reproducing device, the cartridge memory 11 faces a reader/writer of the recording/reproducing device. The cartridge memory 11 communicates with a recording/reproducing device, specifically, a reader/writer of the recording/reproducing device, based on a wireless communication standard according to the LTO standard.

2 CONFIGURATION OF MAGNETIC TAPE

Figure 2:
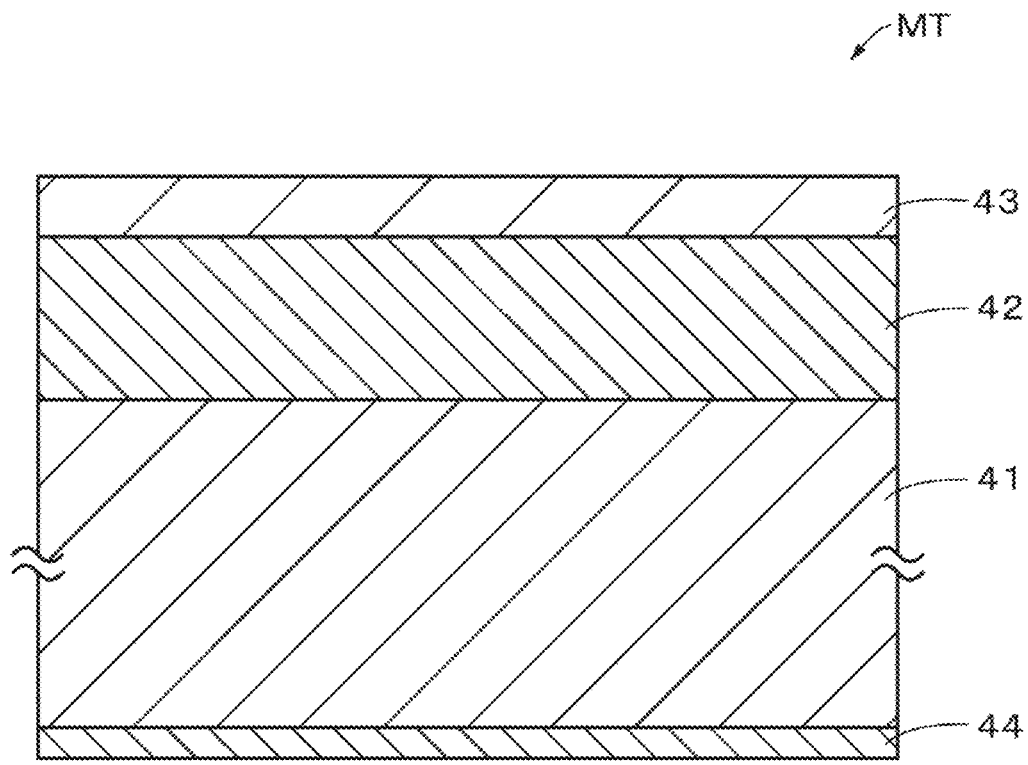
FIG. 2 is a cross-sectional view showing an example of a configuration of a magnetic tape.

FIG. 2 is a cross-sectional view showing an example of a configuration of a magnetic tape MT. The magnetic tape MT is a tape-like magnetic recording medium, and includes a long substrate 41, an underlayer 42 provided on one main surface (first main surface) of the substrate 41, a magnetic layer 43 provided on the underlayer 42, and a back layer 44 provided on the other main surface (second main surface) of the substrate 41. Here, the underlayer 42 and the back layer 44 may be provided as necessary or may not be provided. The magnetic tape MT may be a perpendicular recording type magnetic recording medium, or may be a longitudinal recording type magnetic recording medium.

The magnetic tape MT is suitably used in a recording/reproducing device including a ring-type head as a recording head. The magnetic tape MT preferably has a configuration in which the width of the magnetic tape MT can be kept constant or substantially constant by adjusting the tension of the magnetic tape MT in the longitudinal direction during running by the recording/reproducing device.

(Substrate)

The substrate 41 is a non-magnetic support that supports the underlayer 42 and the magnetic layer 43. The substrate 41 has a long film shape. The upper limit value of the average thickness of the substrate 41 is preferably 4.2 μm or less, more preferably 3.8 μm or less, and still more preferably 3.4 μm or less. When the upper limit value of the average thickness of the substrate 41 is 4.2 μm or less, the recording capacity that can be recorded in one data cartridge can be increased as compared with a general magnetic tape. The lower limit value of the average thickness of the substrate 41 is preferably 3 μm or more, and more preferably 3.2 μm or more. When the lower limit value of the average thickness of the substrate 41 is 3 μm or more, it is possible to minimize a decrease in the strength of the substrate 41.

The average thickness of the substrate 41 is obtained as follows. First, a magnetic tape MT with a width of ½ inch is prepared, and cut to a length of 250 mm to prepare a sample. Subsequently the layers (that is, the underlayer 42, the magnetic layer 43 and the back layer 44) of the sample other than the substrate 41 are removed with a solvent such as methyl ethyl ketone (MEK) or diluted hydrochloric acid. Next, the thickness of the sample (the substrate 41) is measured at positions of 5 or more points using a Laser Hologage (LGH-110C) (commercially available from Mitutoyo) as a measurement device, and the average thickness of the substrate 41 is calculated by simply averaging (taking an arithmetic mean of) these measured values. Here, the measurement positions are randomly selected from the sample.

The substrate 41 preferably contains a polyester. When the substrate 41 contains a polyester, it is possible to reduce the Young's modulus of the substrate 41 in the longitudinal direction. Therefore, when the tension of the magnetic tape MT in the longitudinal direction during running is adjusted by the recording/reproducing device (drive), the width of the magnetic tape MT can be kept constant or substantially constant.

The polyester includes, for example, at least one of polyethylene terephthalate (PET), polyethylene naphthalate (PEN), polybutylene terephthalate (PBT), polybutylene naphthalate (PBN), polycyclohexylene dimethylene terephthalate (PCT), polyethylene-p-oxybenzoate (PEB) and polyethylene bisphenoxycarboxylate. When the substrate 41 contains two or more types of polyesters, these two or more types of polyesters may be mixed, copolymerized, or laminated. At least one of the ends and side chains of the polyester may be modified.

When a polyester is incorporated into the substrate 41, this is confirmed, for example, as follows. First, in the same manner as in the method of measuring an average thickness of the substrate 41, the layers of the sample other than the substrate 41 are removed. Next, an IR spectrum of the sample (the substrate 41) is acquired through infrared absorption spectrometry (IR). Incorporation of the polyester into the substrate 41 can be confirmed based on the IR spectrum.

In addition to the polyester, for example, the substrate 41 may further contain at least one of a polyamide, a polyimide and a polyamide-imide, or may further contain at least one of a polyamide, a polyimide, a polyamide-imide, polyolefins, cellulose derivatives, a vinyl resin, and other polymer resins. The polyamide may be an aromatic polyamide (aramid). The polyimide may be an aromatic polyimide. The polyamide-imide may be an aromatic polyamide-imide.

When the substrate 41 contains a polymer resin other than the polyester, the substrate 41 preferably contains a polyester as a main component. Here, the main component is a component of which the content (mass proportion) is the largest among the polymer resins contained in the substrate 41. When the substrate 41 contains a polymer resin other than the polyester, the polyester and the polymer resin other than the polyester may be mixed or copolymerized.

The substrate 41 may be biaxially stretched in the longitudinal direction and the width direction. The polymer resin contained in the substrate 41 is preferably oriented obliquely with respect to the width direction of the substrate 41.

(Magnetic Layer)

The magnetic layer 43 is a recording layer in which a signal is recorded by a magnetization pattern. The magnetic layer 43 may be a perpendicular recording type recording layer or a longitudinal recording type recording layer. The magnetic layer 43 contains, for example, a magnetic powder and a binding agent. The magnetic layer 43 may further contain, as necessary, at least one additive among a lubricant, an antistatic agent, an abrasive, a curing agent, an antirust agent, non-magnetic reinforcing particles, and the like.

The upper limit value of the average thickness $t_m$ of the magnetic layer 43 is 80 nm or less, preferably 70 nm or less, and more preferably 50 nm or less. If the upper limit value of the average thickness $t_m$ of the magnetic layer 43 is 80 nm or less, since the influence of the diamagnetic field can be reduced when a ring-type head is used as a recording head, it is possible to obtain better electromagnetic conversion characteristics.

The lower limit value of the average thickness $t_m$ of the magnetic layer 43 is preferably 35 nm or more. If the lower limit value of the average thickness $t_m$ of the magnetic layer 43 is 35 nm or more, when a magnetoresistance (MR) type head, a giant magnetoresistance (GMR) type head or a tunnel magnetoresistance (TMR) type head is used as a reproducing head, since it is possible to secure the output, it is possible to obtain better electromagnetic conversion characteristics.

The average thickness $t_m$ of the magnetic layer 43 is obtained as follows. First, the magnetic tape MT to be measured is processed by an FIB method or the like and sliced. When the FIB method is used, a carbon layer and a tungsten layer are formed as protective films as a pretreatment for observing a TEM image of a cross section to be described below. The carbon layer is formed on the surface of the magnetic layer 43 and the surface of the back layer 44 of the magnetic tape MT by a vapor deposition method, and the tungsten layer is then additionally formed on the surface of the magnetic layer 43 by a vapor deposition method or a sputtering method. The slicing is performed in the length direction (longitudinal direction) of the magnetic tape MT. That is, according to the slicing, a cross section parallel to both the longitudinal direction and the thickness direction of the magnetic tape MT is formed.

The cross section of the obtained sliced sample is observed under a transmission electron microscope (TEM) according to the following conditions to obtain a TEM image. Here, the magnification and the acceleration voltage may be appropriately adjusted according to the type of the device.

Device: TEM (H9000NAR commercially available from Hitachi, Ltd.)
  Acceleration voltage: 300 kV
  Magnification: 100,000

Next, using the obtained TEM image, the thickness of the magnetic layer 43 is measured at positions of at least 10 points or more in the longitudinal direction of the magnetic tape MT. The average value obtained by simply averaging (taking an arithmetic mean of) the obtained measured values is defined as the average thickness $t_m$[nm] of the magnetic layer 43. Here, the positions at which the measurement is performed are randomly selected from the test piece.

(Magnetic Powder)

The magnetic powder contains a plurality of magnetic particles. The magnetic particles are, for example, particles containing hexagonal ferrite particles (hereinafter referred to as "hexagonal ferrite particles"), containing epsilon type iron oxide (ε-iron oxide) (hereinafter referred to as "ε-iron oxide particles") or particles containing Co-containing spinel ferrite (hereinafter referred to as "cobalt ferrite particles"). It is preferable for the magnetic powder to be crystal-orientated preferentially in the thickness direction (vertical direction) of the magnetic tape MT.

(Hexagonal Ferrite Particle)

The hexagonal ferrite particles have, for example, a plate shape such as a hexagonal plate shape. In this specification, the hexagonal plate shape includes a substantially hexagonal plate shape. The hexagonal ferrite preferably contains at least one of Ba, Sr, Pb and Ca, and more preferably at least one of Ba and Sr. Specifically, the hexagonal ferrite may be, for example, barium ferrite or strontium ferrite. The barium ferrite may further contain at least one of Sr, Pb and Ca in addition to Ba. The strontium ferrite may further contain at least one of Ba, Pb and Ca in addition to Sr.

More specifically, the hexagonal ferrite has an average composition represented by a general formula of $MFe_{12}O_{19}$. Here, M is, for example, at least one metal of Ba, Sr, Pb and Ca, and preferably at least one metal of Ba and Sr. M may be a combination of Ba, and at least one metal selected from the group consisting of Sr, Pb and Ca. In addition, M may be a combination of Sr, and at least one metal selected from the group consisting of Ba, Pb and Ca. In the above general formula, some of Fe may be replaced with other metal elements.

(ε-Iron Oxide Particles)

The ε-iron oxide particles are hard magnetic particles that allow a high coercive force to be obtained even with fine particles. The ε-iron oxide particles have a spherical shape or a cube shape. In this specification, the spherical shape includes a substantially spherical shape. In addition, the cube shape includes a substantially cube shape. Since the ε-iron oxide particles have the above shape, when the ε-iron oxide particles are used as magnetic particles, it is possible to reduce the contact area between particles in the thickness direction of the magnetic tape MT and restrict aggregation of the particles, compared with when barium ferrite particles having a hexagonal plate shape are used as magnetic particles. Therefore, it is possible to improve the dispersibility of the magnetic powder, and obtain better electromagnetic conversion characteristics (for example, SNR).

The ε-iron oxide particles have a core-shell type structure. Specifically, the ε-iron oxide particles have a core part and a shell part having a two-layer structure provided around the core part. The shell part having a two-layer structure has a first shell part provided on the core part and a second shell part provided on the first shell part.

The core part contains ε-iron oxide. The ε-iron oxide contained in the core part is preferably composed of $\varepsilon\text{-Fe}_2O_3$ crystal as a main phase, and more preferably composed of single-phase $\varepsilon\text{-Fe}_2O_3$.

The first shell part covers at least a part of the periphery of the core part. Specifically, the first shell part may partially cover the periphery of the core part or may cover the entire periphery of the core part. In order to make exchange coupling between the core part and the first shell part sufficient and improve magnetic characteristics, it is preferable to cover the entire surface of the core part.

The first shell part is a so-called soft magnetic layer, and contains, for example, a soft magnetic component such as α-Fe, Ni—Fe alloys or Fe—Si—Al alloys. α-Fe may be obtained by reducing the ε-iron oxide contained in the core part.

The second shell part is an oxide film as an antioxidant layer. The second shell part contains α-iron oxide, aluminum oxide or silicon oxide. The α-iron oxide includes, for example, at least one iron oxide among $Fe_3O_4$, $Fe_2O_3$ and FeO. When the first shell part contains α-Fe (soft magnetic component), the α-iron oxide may be obtained by oxidizing α-Fe contained in the first shell part.

Since the ε-iron oxide particles have the first shell part as described above, the coercive force He of the core part alone is kept at a large value in order to secure thermal stability, and the coercive force He of the entire ε-iron oxide particles (core-shell particles) can be adjusted to a coercive force He suitable for recording. In addition, when the ε-iron oxide particles have the second shell part as described above, in a process of producing the magnetic tape MT and before the process, it is possible to minimize deterioration of the characteristics of the ε-iron oxide particles due to the ε-iron oxide particles being exposed to the air, and rust and the like being generated on the surfaces of the particles. Therefore, it is possible to minimize deterioration of characteristics of the magnetic tape MT.

The ε-iron oxide particles may have a shell part having a single-layer structure. In this case, the shell part has the same configuration as the first shell part. Here, in order to minimize deterioration of characteristics of the ε-iron oxide particles, as described above, it is preferable for the ε-iron oxide particles to have a shell part having a two-layer structure.

The ε-iron oxide particles may contain an additive in place of the core-shell structure, or may contain an additive together with the core-shell structure. In this case, some of Fe of the ε-iron oxide particles is replaced with an additive. Even if the ε-iron oxide particles contain an additive, since the coercive force Hc of the entire ε-iron oxide particles can be adjusted to a coercive force Hc suitable for recording, it is possible to improve ease of recording. The additive is a metal element other than iron, preferably a trivalent metal element, more preferably at least one of Al, Ga and In, and still more preferably at least one of Al and Ga.

Specifically, the ε-iron oxide containing an additive is an $\varepsilon\text{-Fe}_{2-x}M_xO_3$ crystal (where, M is a metal element other than iron, preferably a trivalent metal element, more preferably at least one of Al, Ga and In, and still more preferably at least one of Al and Ga. x is, for example, $0<x<1$).

(Cobalt Ferrite Particle)

The cobalt ferrite particles preferably have uniaxial crystal anisotropy. When the cobalt ferrite particles have uniaxial crystal anisotropy, the magnetic powder can be crystal-oriented preferentially in the thickness direction (vertical direction) of the magnetic tape MT. The cobalt ferrite particles have, for example, a cube shape. In this specification, the cube shape includes a substantially cube shape. The Co-containing spinel ferrite may further contain at least one of Ni, Mn, Al, Cu and Zn in addition to Co.

The Co-containing spinel ferrite has, for example, an average composition represented by the following formula.

$$Co_xM_yFe_2O_z$$

(where, in the formula, M is, for example, at least one metal among Ni, Mn, Al, Cu and Zn; x is a value in a range of $0.4\leq x\leq 1.0$; y is a value in a range of $0\leq y\leq 0.3$; here, x and y satisfy a relationship of $(x+y)\leq 1.0$; z is a value in a range of $3\leq z\leq 4$; and some of Fe may be replaced with other metal elements).

(Binding Agent)

Examples of binding agents include a thermoplastic resin, a thermosetting resin, and a reactive resin. Examples of thermoplastic resins include vinyl chloride, vinyl acetate, vinyl chloride-vinyl acetate copolymers, vinyl chloride-vinylidene chloride copolymers, vinyl chloride-acrylonitrile copolymers, acrylic acid ester-acrylonitrile copolymers, acrylic acid ester-vinyl chloride-vinylidene chloride copolymers, acrylic acid ester-acrylonitrile copolymers, acrylic acid ester-vinylidene chloride copolymers, methacrylic acid ester-vinylidene chloride copolymers, methacrylic acid ester-vinyl chloride copolymers, methacrylic acid ester-ethylene copolymers, polyvinyl fluoride, vinylidene chloride-acrylonitrile copolymers, acrylonitrile-butadiene copolymers, polyamide resins, polyvinyl butyral, cellulose derivatives (cellulose acetate butyrate, cellulose diacetate, cellulose triacetate, cellulose propionate, nitrocellulose), styrene butadiene copolymers, polyurethane resins, polyester resins, amino resins, and synthetic rubber.

Examples of thermosetting resins include phenolic resins, epoxy resins, polyurethane curable resins, urea resins, melamine resins, alkyd resins, silicone resins, polyamine resins, and urea formaldehyde resins.

In order to improve the dispersibility of the magnetic powder, $-SO_3M$, $-OSO_3M$, $-COOM$, $P=O(OM)_2$ (where, in the formula, M represents a hydrogen atom or an alkali metal such as lithium, potassium, and sodium), an side chain amine having an end group represented by $-NR1R2$, or $-NR1R2R3^+X^-$, a main chain amine represented by $-NR1R2^+X^-$ (where, in the formula, R1, R2, and R3 represent a hydrogen atom or a hydrocarbon group, and $X^-$ represents a halogen element ion such as fluorine, chlorine, bromine, and iodine, or an inorganic ion or an organic ion), and additionally, a polar functional group such as $-OH$, $-SH$, $-CN$, and an epoxy group may be introduced into all the above binding agents. The amount of these polar functional groups introduced into the binding agent is preferably $10^{-1}$ to $10^{-8}$ mol/g and more preferably $10^{-2}$ to $10^{-6}$ mol/g.

(Lubricant)

The lubricant contains, for example, at least one selected from among fatty acids and fatty acid esters, and preferably contains both fatty acids and fatty acid esters. When the magnetic layer 43 contains a lubricant, particularly, when the magnetic layer 43 contains both fatty acids and fatty acid esters, this contributes to improving the running stability of the magnetic tape MT.

The fatty acid is preferably a compound represented by the following General Formula (1) or (2). For example, one or both of the compound represented by the following General Formula (1) and the compound represented by General Formula (2) may be contained as the fatty acid.

In addition, the fatty acid ester is preferably a compound represented by the following General Formula (3) or (4). For example, one or both of the compound represented by the following General Formula (3) and the compound represented by General Formula (4) may be contained as the fatty acid ester.

When the lubricant contains one or both of the compound represented by General Formula (1) and the compound represented by General Formula (2), and one or both of the compound represented by General Formula (3) and the compound represented by General Formula (4), it is possible to minimize an increase in the coefficient of dynamic friction due to repeated recording or reproducing of the magnetic tape MT.

$$CH_3(CH_2)_kCOOH \qquad (1)$$

(where, in General Formula (1), k is an integer selected from the range of 14 or more and 22 or less, and more preferably selected from the range of 14 or more and 18 or less).

$$CH_3(CH_2)_nCH=CH(CH_2)_mCOOH \qquad (2)$$

(where, in General Formula (2), a sum of n and m is an integer selected from the range of 12 or more and 20 or less, and more preferably selected from the range of 14 or more and 18 or less).

$$CH_3(CH_2)_pCOO(CH_2)_qCH_3 \qquad (3)$$

(where, in General Formula (3), p is an integer selected from the range of 14 or more and 22 or less, and more preferably selected from the range of 14 or more and 18 or less, and q is an integer selected from the range of 2 or more and 5 or less, and more preferably selected from the range of 2 or more and 4 or less).

$$CH_3(CH_2)_rCOO-(CH_2)_sCH(CH_3)2 \qquad (4)$$

(where, in General Formula (4), r is an integer selected from the range of 14 or more and 22 or less, and s is an integer selected from the range of 1 or more and 3 or less).

(Antistatic Agent)

Examples of antistatic agents include carbon black, a natural surfactant, a nonionic surfactant, and a cationic surfactant.

(Abrasive)

Examples of abrasives include α-alumina with an a transformation rate of 90% or more, β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, needle-shaped α-iron oxides obtained by dehydrating and annealing raw materials of magnetic iron oxide, and those obtained by performing a surface treatment on the above materials with aluminum and/or silica as necessary.

(Curing Agent)

Examples of curing agents include polyisocyanate. Examples of polyisocyanates include aromatic polyisocyanates such as adducts of tolylene diisocyanate (TDI) and an active hydrogen compound, and aliphatic polyisocyanates such as adducts of hexamethylene diisocyanate (HMDI) and an active hydrogen compound. The weight-average molecular weight of these polyisocyanates is preferably in a range of 100 to 3,000.

(Antirust Agent)

Examples of antirust agents include phenols, naphthols, quinones, heterocyclic compounds containing nitrogen atoms, heterocyclic compounds containing oxygen atoms, and heterocyclic compounds containing sulfur atoms.

(Non-Magnetic Reinforcing Particles)

Examples of non-magnetic reinforcing particles include aluminum oxide (α, β or γ alumina), chromium oxide, silicon oxide, diamond, garnet, emery, boron nitride, titanium carbide, silicon carbide, titanium carbide, and titanium oxide (rutile type or anatase type titanium oxide).

(Underlayer)

The underlayer 42 is provided to alleviate the unevenness of the surface of the substrate 41 and adjust the unevenness of the surface of the magnetic layer 43. The underlayer 42 is a non-magnetic layer containing a non-magnetic powder, a binding agent and a lubricant. According to the underlayer 42, the lubricant is supplied to the surface of the magnetic layer 43. The underlayer 42 may further contain at least one additive among an antistatic agent, a curing agent, an antirust agent, and the like, as necessary.

The average thickness of the underlayer 42 is preferably 0.3 μm or more 2.0 μm or less, and more preferably 0.5 μm or more 1.4 μm or less. Here, the average thickness of the underlayer 42 is obtained in the same manner as in the average thickness $t_m$ of the magnetic layer 43. Here, the magnification of the TEM image is appropriately adjusted according to the thickness of the underlayer 42. When the average thickness of the underlayer 42 is 2.0 μm or less, since the degree of expansion and contraction of the magnetic tape MT is larger due to an external force, it is easier to adjust the width of the magnetic tape MT by adjusting the tension.

(Non-Magnetic Powder)

The non-magnetic powder contains, for example, at least one of inorganic particle powder and inorganic particle powder. In addition, the non-magnetic powder may contain carbon powder such as carbon black. Here, one type of non-magnetic powder may be used alone, or two or more types of non-magnetic powders may be used in combination. Examples of inorganic particles include metals, metal oxides, metal carbonates, metal sulfates, metal nitrides, metal carbides and metal sulfides. Examples of shapes of non-magnetic powders include various shapes such as a needle shape, a spherical shape, a cube shape, and a plate shape, but the present disclosure is not limited to these shapes.

(Binding Agent and Lubricant)

The binding agent and the lubricant are the same as those of the above magnetic layer 43.

(Additive)

The antistatic agent, the curing agent and the antirust agent are the same as those of the above magnetic layer 43.

(Back Layer)

The back layer 44 contains a binding agent and a non-magnetic powder. The back layer 44 may further contain at least one additive among a lubricant, a curing agent, an antistatic agent, and the like, as necessary. The binding agent and the non-magnetic powder are the same as those of the above underlayer 42.

The upper limit value of the average thickness of the back layer 44 is preferably 0.6 μm or less. When the upper limit value of the average thickness of the back layer 44 is 0.6 μm or less, even if the average thickness of the magnetic tape MT is 5.6 μm or less, since the thickness of the underlayer 42 and the substrate 41 can be kept thick, it is possible to maintain the running stability of the magnetic tape MT in the recording/reproducing device. The lower limit value of the average thickness of the back layer 44 is not particularly limited, and is, for example, 0.2 μm or more.

The average thickness $t_b$ of the back layer 44 is obtained as follows. First, the average thickness $t_T$ of the magnetic tape MT is measured. The method of measuring the average thickness $t_T$ is as described in the following "Average thickness of magnetic tape." Subsequently, the back layer 44 of the sample is removed with a solvent such as methyl ethyl ketone (MEK) or diluted hydrochloric acid. Next, the thickness of the sample is measured at positions of 5 or more points using the Laser Hologage (LGH-110C) (commercially available from Mitutoyo), and the average value $t_B[\mu m]$ is calculated by simply averaging (taking an arithmetic mean of) these measured values. Then, the average thickness $t_b[\mu m]$ of the back layer 44 is obtained from the following formula. Here, the measurement positions are randomly selected from the sample.

$$t_b[\mu m]=t_T[\mu m]-t_B[\mu m]$$

(Average Thickness of Magnetic Tape)

The upper limit value of the average thickness (average total thickness) $t_T$ of the magnetic tape MT is 5.6 μm or less, preferably 5.0 μm or less, more preferably 4.6 μm or less, and still more preferably 4.4 μm or less. When the average thickness $t_T$ of the magnetic tape MT is 5.6 μm or less, the recording capacity that can be recorded in one data cartridge can be increased as compared with a general magnetic tape. The lower limit value of the average thickness $t_T$ of the magnetic tape MT is not particularly limited, and is, for example, 3.5 μm or more.

The average thickness $t_T$ of the magnetic tape MT is obtained as follows. First, a magnetic tape MT with a width of ½ inch is prepared, and cut to a length of 250 mm to prepare a sample. Next, the thickness of the sample is measured at positions of 5 or more points using the Laser Hologage (LGH-110C) (commercially available from Mitutoyo) as a measurement device, and the average thickness $t_T[\mu m]$ is calculated by simply averaging (taking an arithmetic mean of) these measured values. Here, the measurement positions are randomly selected from the sample.

(Coercive Force)

The upper limit value of the coercive force Hc2 of the magnetic layer 43 in the longitudinal direction of the magnetic tape MT is preferably 2,000 Oe or less, more preferably 1,900 Oe or less, and still more preferably 1,800 Oe or less. When the coercive force Hc2 of the magnetic layer 43 in the longitudinal direction is 2,000 Oe or less, sufficient electromagnetic conversion characteristics can be provided even at a high recording density.

The lower limit value of the coercive force Hc2 of the magnetic layer 43 measured in the longitudinal direction of the magnetic tape MT is preferably 1,000 Oe or more. When the coercive force Hc2 of the magnetic layer 43 measured in the longitudinal direction is 1,000 Oe or more, demagnetization due to leakage flux from the recording head can be minimized.

The coercive force Hc2 is obtained as follows. First, three magnetic tapes MT are laminated with a double-sided tape and then punched out with a φ6.39 mm punch to prepare a measurement sample. In this case, marking is performed with an arbitrary non-magnetic ink so that the longitudinal direction (running direction) of the magnetic tape MT can be recognized. Then, an M-H loop of the measurement sample (the entire magnetic tape MT) corresponding to the longitudinal direction (running direction) of the magnetic tape MT is measured using a vibrating sample magnetometer (VSM). Next, coating films (the underlayer 42, the magnetic layer 43, the back layer 44 and the like) are wiped off with acetone, ethanol or the like, and only the substrate 41 remains. Then, three of the obtained substrates 41 are laminated with a double-sided tape, and then punched out with a φ6.39 mm punch to prepare a sample for background correction (hereinafter simply referred to as a "sample for correction"). Then, an M-H loop of the sample for correction (the substrate 41) corresponding to the vertical direction (the vertical direction of the magnetic tape MT) of the substrate 41 is measured using the VSM.

A high sensitivity vibrating sample magnetometer "Type VSM-P7-15" (commercially available from Toei Industry Co., Ltd.) is used for measuring the M-H loop of the measurement sample (the entire magnetic tape MT) and the M-H loop of the sample for correction (the substrate 41). The measurement conditions are as follows: measurement mode: full loop, maximum magnetic field: 15 kOe, magnetic field step: 40 bit, Time constant of Locking amp: 0.3 sec, Waiting time: 1 sec, and MH average number: 20.

After the M-H loop of the measurement sample (the entire magnetic tape MT) and the M-H loop of the sample for correction (the substrate 41) are obtained, the M-H loop of the sample for correction (the substrate 41) is subtracted from the M-H loop of the measurement sample (the entire magnetic tape MT) to perform background correction, and the M-H loop after background correction is obtained. A measurement/analysis program bundled in "Type VSM-P7-15" is used for calculating this background correction. The coercive force Hc2 is obtained from the obtained M-H loop after background correction. Here, for this calculation, a measurement/analysis program bundled in "Type VSM-P7-15" is used. Here, all the above M-H loops are measured at 25° C. In addition, "diamagnetic field correction" when the M-H loop is measured in the longitudinal direction of the magnetic tape MT is not performed.

(Squareness Ratio)

The squareness ratio S1 of the magnetic layer 43 in the vertical direction (thickness direction) of the magnetic tape MT is preferably 65% or more, more preferably 70% or more, still more preferably 75% or more, particularly preferably 80% or more, and most preferably 85% or more. When the squareness ratio S1 is 65% or more, since the vertical orientation of the magnetic powder is sufficiently improved, it is possible to obtain better electromagnetic conversion characteristics.

The squareness ratio S1 in the vertical direction is obtained as follows. First, three magnetic tapes MT are laminated with a double-sided tape, and then punched out with a φ6.39 mm punch to prepare a measurement sample. In this case, marking is performed with an arbitrary non-magnetic ink so that the longitudinal direction (running direction) of the magnetic tape MT can be recognized. Then, an M-H loop of the measurement sample (the entire magnetic tape MT) corresponding to the vertical direction (thickness direction) of the magnetic tape MT is measured using the VSM. Next, coating films (the underlayer 42, the magnetic layer 43, the back layer 44 and the like) are wiped off with acetone, ethanol or the like, and only the substrate 41 remains. Then, three of the obtained substrates 41 are laminated with a double-sided tape and then punched out with a φ6.39 mm punch to prepare sample for background correction (hereinafter simply referred to as a "sample for correction"). Then, an M-H loop of the sample for correction (the substrate 41) corresponding to the vertical direction (the vertical direction of the magnetic tape MT) of the substrate 41 is measured using the VSM.

A high sensitivity vibrating sample magnetometer "Type VSM-P7-15" (commercially available from Toei Industry Co., Ltd.) is used for measuring the M-H loop of the measurement sample (the entire magnetic tape MT) and the M-H loop of the sample for correction (the substrate 41). The measurement conditions are as follows: measurement mode: full loop, maximum magnetic field: 15 kOe, magnetic field step: 40 bit, Time constant of Locking amp: 0.3 sec, Waiting time: 1 sec, and MH average number: 20.

After the M-H loop of the measurement sample (the entire magnetic tape MT) and the M-H loop of the sample for correction (the substrate 41) are obtained, the M-H loop of the sample for correction (the substrate 41) is subtracted from the M-H loop of the measurement sample (the entire magnetic tape MT) to perform background correction, and the M-H loop after background correction is obtained. A measurement/analysis program bundled in "Type VSM-P7-15" is used for calculating this background correction.

A saturation magnetization Ms (emu) and a residual magnetization Mr (emu) of the obtained M-H loop after background correction are substituted into the following formula, and the squareness ratio S1(%) is calculated. Here, all the above M-H loops are measured at 25° C. In addition, "diamagnetic field correction" when the M-H loop is measured in the vertical direction of the magnetic tape MT is not measured. Here, for this calculation, a measurement/analysis program bundled in "Type VSM-P7-15" is used squareness ratio S1(%)=(Mr/Ms)×100

The squareness ratio S2 of the magnetic layer 43 in the longitudinal direction (running direction) of the magnetic tape MT is preferably 35% or less, more preferably 30% or less, still more preferably 25% or less, particularly preferably 20% or less, and most preferably 15% or less. When the squareness ratio S2 is 35% or less, since the vertical orientation of the magnetic powder is sufficiently improved, it is possible to obtain better electromagnetic conversion characteristics.

The squareness ratio S2 in the longitudinal direction is obtained in the same manner as the squareness ratio S1 except that the M-H loop is measured in the longitudinal direction (running direction) of the magnetic tape MT and the substrate 41.

(Ratio of Coercive Force)

A ratio Hc2/Hc1 of the coercive force Hc2 of the magnetic layer 43 in the longitudinal direction to the coercive force Hc1 of the magnetic layer 43 in the vertical direction satisfies a relationship of Hc2/Hc1≤0.8, preferably Hc2/Hc1≤0.75, more preferably Hc2/Hc1≤0.7, still more preferably Hc2/Hc1≤0.65, and particularly preferably Hc2/Hc1≤0.6. When the coercive forces Hc1 and Hc2 satisfy a relationship of Hc2/Hc1≤0.8, it is possible to increase the degree of vertical orientation of the magnetic powder. Therefore, the magnetization transition width can be reduced and a high-output signal can be obtained during signal reproduction, and thus it is possible to obtain better electromagnetic conversion characteristics. Here, as described above, when Hc2 is small, since magnetization reacts with high sensitivity due to a magnetic field in the vertical direction from the recording head, it is possible to form a favorable recording pattern.

When the ratio Hc2/Hc1 is Hc2/Hc1≤0.8, the average thickness $t_m$ of the magnetic layer 43 is particularly effectively 90 nm or less. If the average thickness $t_m$ of the magnetic layer 43 exceeds 90 nm, when a ring-type head is used as the recording head, the lower area (area on the side of the underlayer 42) of the magnetic layer 43 may be magnetized in the longitudinal direction, and the magnetic layer 43 may not be uniformly magnetized in the thickness direction. Therefore, even if the ratio Hc2/Hc1 is Hc2/Hc1≤0.8 (that is, even if the degree of vertical orientation of the magnetic powder is high), better electromagnetic conversion characteristics may not be obtained.

The lower limit value of Hc2/Hc1 is not particularly limited, and is, for example, 0.5≤Hc2/Hc1. Here, the Hc2/Hc1 indicates a degree of vertical orientation of the magnetic powder, and a small Hc2/Hc1 indicates a higher degree of vertical orientation of the magnetic powder.

A method of calculating the coercive force Hc2 of the magnetic layer 43 in the longitudinal direction is as described above. The coercive force Hc1 of the magnetic layer 43 in the vertical direction is obtained in the same manner as the coercive force Hc2 of the magnetic layer 43 in the longitudinal direction except that the M-H loop is measured in the vertical direction (thickness direction) of the magnetic tape MT and the substrate 41.

(Young's Modulus of Magnetic Tape in Longitudinal Direction)

The Young's modulus of the magnetic tape MT in the longitudinal direction is preferably 8.0 GPa or less, more preferably 7.9 GPa or less, still more preferably 7.5 GPa or less, and particularly preferably 7.1 GPa or less. When the Young's modulus of the magnetic tape MT in the longitudinal direction is 8.0 GPa or less, since the degree of expansion and contraction of the magnetic tape MT is larger due to an external force, it is easier to adjust the width of the magnetic tape MT by adjusting the tension. Therefore, it is possible to more appropriately minimize off-track errors, and it is possible to more accurately reproduce data recorded in the magnetic tape MT.

The Young's modulus of the magnetic tape MT in the longitudinal direction is a value indicating a lower likelihood of expansion and contraction of the magnetic tape MT in the longitudinal direction due to an external force, and when this value is larger, the magnetic tape MT is less likely to expand and contract in the longitudinal direction due to an external force, and when this value is smaller, the magnetic tape MT is more likely to expand and contract in the longitudinal direction due to an external force.

Here, the Young's modulus of the magnetic tape MT in the longitudinal direction is a value related to the magnetic tape MT in the longitudinal direction, but it also correlates with a lower likelihood of expansion and contraction of the magnetic tape MT in the width direction. That is, when this value is larger, the magnetic tape MT is less likely to expand and contract in the width direction due to an external force, and when this value is smaller, the magnetic tape MT is more likely to expand and contract in the width direction due to an external force. Therefore, in consideration of tension adjustment, a smaller Young's modulus of the magnetic tape MT in the longitudinal direction is advantageous.

A tensile strength tester (AG-100D commercially available from Shimadzu Corporation) is used to measure the Young's modulus. If it is desired to measure the Young's modulus of the tape in the longitudinal direction, the tape is cut to a length of 180 mm to prepare a measurement sample. A jig that can fix the width (½ inch) of the tape is attached to the tensile strength tester, and the top and bottom of the tape width are fixed. The distance (the length of the tape between chucks) is 100 mm. After the tape sample is chucked, stress is gradually applied in the direction in which the sample is pulled. The pulling speed is 0.1 mm/min. The Young's modulus is calculated using the following formula from the change in the stress and the amount of elongation in this case.

$$E(\text{N/m}^2) = ((\Delta N/S)/(\Delta x/L)) \times 10^6$$

ΔN: Change in stress (N)
S: Cross-sectional area of test piece (mm$^2$)
Δx: Amount of elongation (mm)
L: Distance between gripping jigs (mm)

The stress range is set to 0.5 N to 1.0 N, and the change in stress (ΔN) and the amount of elongation (Δx) in this case are used for calculation.

(Young's Modulus of Substrate in Longitudinal Direction)

The Young's modulus of the substrate 41 in the longitudinal direction is preferably 7.5 GPa or less, more preferably 7.4 GPa or less, still more preferably 7.0 GPa or less, and particularly preferably 6.6 GPa or less. When the Young's modulus of the substrate 41 in the longitudinal direction is 7.5 GPa or less, since the degree of expansion and contraction of the magnetic tape MT is larger due to an external force, it is easier to adjust the width of the magnetic tape MT by adjusting the tension. Therefore, it is possible to more appropriately minimize off-track errors, and it is possible to more accurately reproduce data recorded in the magnetic tape MT.

The Young's modulus of the substrate 41 in the longitudinal direction is obtained as follows. First, the underlayer 42, the magnetic layer 43 and the back layer 44 are removed from the magnetic tape MT to obtain the substrate 41. The Young's modulus of the substrate 41 in the longitudinal direction is obtained using the substrate 41 in the same procedure as in the above Young's modulus of the magnetic tape MT in the longitudinal direction.

The thickness of the substrate 41 occupies more than half of the thickness of the entire magnetic tape MT. Therefore, the Young's modulus of the substrate 41 in the longitudinal direction correlates with a lower likelihood of expansion and contraction of the magnetic tape MT due to an external force, and when this value is larger, the magnetic tape MT is less likely to expand and contract in the width direction due to an external force, and when this value is smaller, the magnetic tape MT is more likely to expand and contract in the width direction due to an external force.

Here, the Young's modulus of the substrate 41 in the longitudinal direction is a value related to the magnetic tape MT in the longitudinal direction, and but it also correlates with a lower likelihood of expansion and contraction of the magnetic tape MT in the width direction. That is, when this value is larger, the magnetic tape MT is less likely to expand and contract in the width direction due to an external force, and when this value is smaller, the magnetic tape MT is more likely to expand and contract in the width direction due to an external force. Therefore, in consideration of tension adjustment, a smaller Young's modulus of the substrate 41 in the longitudinal direction is advantageous.

3 FORMAT OF MAGNETIC TAPE

Figure 3:
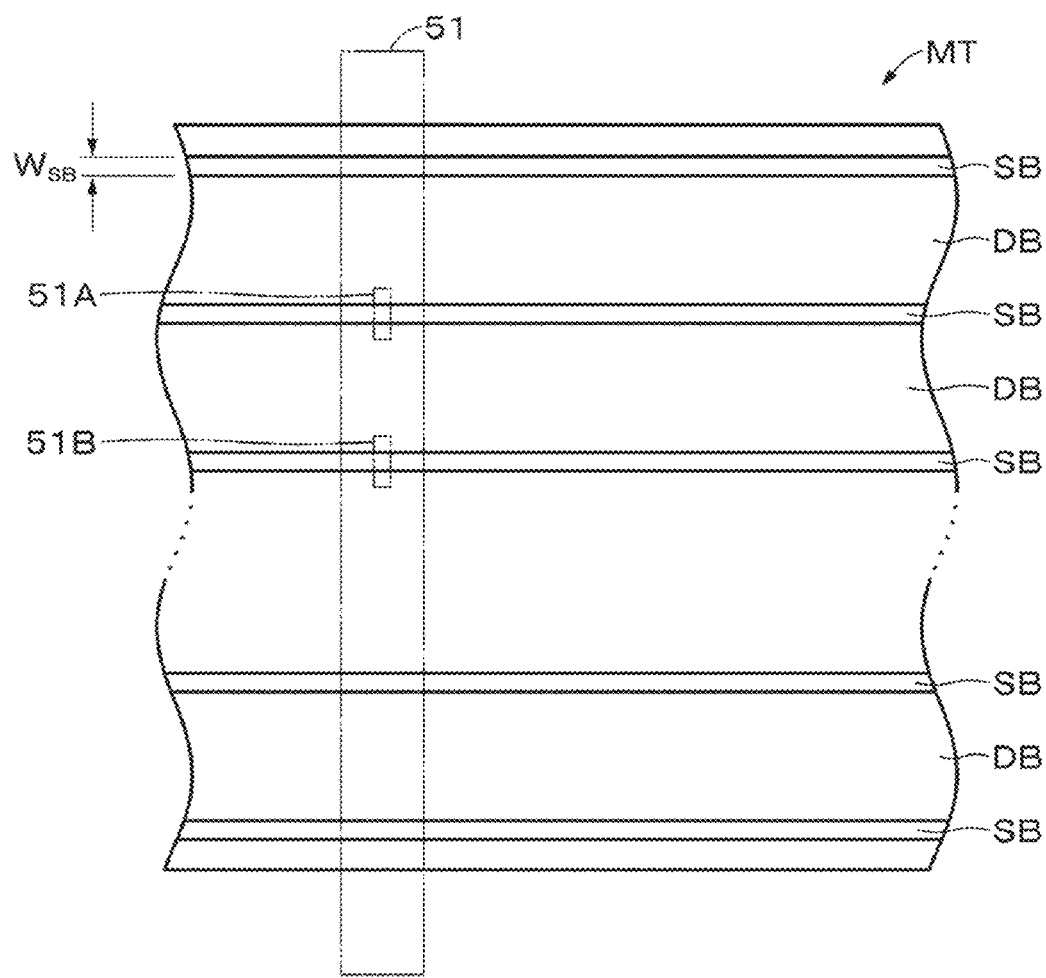
FIG. 3 is a schematic diagram showing an example of a layout of data bands and servo bands.

FIG. 3 is a schematic diagram showing an example of a layout of data bands and servo bands. The magnetic tape MT (specifically, the magnetic layer 43) may have a plurality of servo bands SB and a plurality of data bands DB in advance. The plurality of servo bands SB are provided at equal intervals in the width direction of the magnetic tape MT. A data band DB is provided between adjacent servo bands SB. The servo band SB is used for guiding a magnetic head 51 (specifically, servo lead heads 51A and 51B) of the recording/reproducing device (drive) when data is recorded or reproduced. In the servo band SB, a servo pattern (servo signal) for controlling tracking of the magnetic head 51 is written in advance. User data is recorded in the data band DB.

The upper limit value of the ratio $R_S(=(S_{SB}/S)\times100)$ of the total area $S_{SB}$ of the plurality of servo bands SB to the area S of the surface of the magnetic layer 43 is preferably 4.0% or less, more preferably 3.0% or less, and still more preferably 2.0% or less in order to secure a high recording capacity. On the other hand, the lower limit value of the ratio $R_S$ of the total area $S_{SB}$ of the plurality of servo bands SB to the area S of the surface of the magnetic layer 43** is preferably 0.8% or more in order to secure five or more servo bands SB.

The ratio $R_S$ of the total area $S_{SB}$ of the plurality of servo bands SB to the area S of the entire surface of the magnetic layer 43 is obtained as follows. The magnetic tape MT is developed using a ferricolloid developer (commercially available from Sigma Hi-Chemical Inc., SigMarker Q), the developed magnetic tape MT is then observed under an optical microscope, and the servo bandwidth $W_{SB}$ and the number of servo bands SB are measured. Next, the ratio $R_S$ is obtained from the following formula.

Ratio $R_S$[%]=(((servo bandwidth $W_{SB}$)×(the number of servo bands $SB$))/(width of the magnetic tape $MT$))×100

The number of servo bands SB is preferably 5 or more, and more preferably 5+4n (where, n is a positive integer) or more. When the number of servo bands SB is 5 or more, it is possible to minimize the influence on the servo signal due to the change in the size of the magnetic tape MT in the width direction, and it is possible to secure stable recording/reproducing characteristics with fewer off-track errors. The upper limit value of the number of servo bands SB is not particularly limited, and is, for example, 33 or less.

The number of servo bands SB is obtained in the same manner as in the above method of calculating the ratio $R_S$.

In order to secure a high recording capacity, the upper limit value of the servo bandwidth $W_{SB}$ is preferably 99 μm or less, more preferably 60 μm or less, and still more preferably 30 μm or less. The lower limit value of the servo bandwidth $W_{SB}$ is preferably 10 μm or more.

The width of the servo bandwidth $W_{SB}$ is obtained in the same manner as in the above method of calculating the ratio RS.

Figure 4:
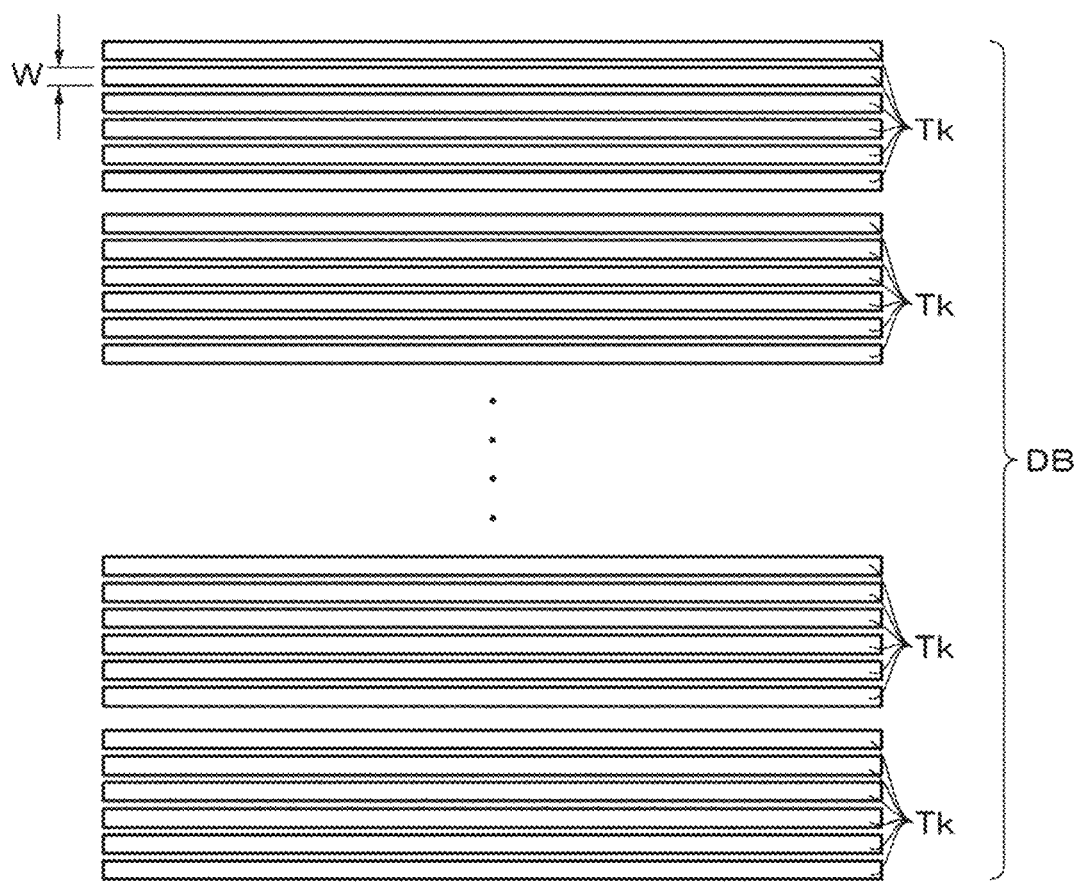
FIG. 4 is an enlarged view showing an example of a configuration of a data band.

FIG. 4 is an enlarged view showing an example of a configuration of a data band. The magnetic layer 43 has a configuration in which a plurality of data tracks Tk can be formed in the data band DB. In order to improve a track recording density and secure a high recording capacity, the upper limit value of the data track width W is preferably 2,000 nm or less, more preferably 1,500 nm or less, and still more preferably 1,000 nm. The lower limit value of the data track width W is preferably 20 nm or more in consideration of the magnetic particle size.

In order to secure a high recording capacity, the magnetic layer 43 has a configuration in which data can be recorded so that the minimum value L of the distance between magnetization reversals is preferably 48 nm or less, more preferably 44 nm or less, and still more preferably 40 nm or less. The lower limit value of the minimum value L of the distance between magnetization reversals is preferably 20 nm or more in consideration of the magnetic particle size.

The magnetic layer 43 has a configuration in which data can be recorded so that the minimum value L of the distance between magnetization reversals and the data track width W satisfy preferably W/L≤35, more preferably W/L≤30, and still more preferably W/L≤25. When the minimum value L of the distance between magnetization reversals is a certain value, and the minimum value L of the distance between magnetization reversals and the track width W satisfy W/L>35 (that is, when the track width W is large), since the track recording density does not increase, a sufficient recording capacity may not be secured. In addition, when the track width W is a certain value, and the minimum value L of the distance between magnetization reversals and the track width W satisfy W/L>35 (that is, when the minimum value L of the distance between magnetization reversals is small), the bit length becomes smaller, and the line recording density increases, but electromagnetic conversion characteristics may significantly deteriorate due to the influence of the spacing loss. Therefore, in order to secure the recording capacity and minimize deterioration of electromagnetic conversion characteristics, the W/L is preferably in a range of W/L≤35 as described above. The lower limit value of W/L is not particularly limited, and is, for example, 1≤W/L.

The data track width W is obtained as follows. The magnetic tape MT in which data is recorded on the entire surface is prepared, a data recording pattern of the data band DB part of the magnetic layer 43 is observed using a magnetic force microscope (MFM) to obtain an MFM image. As the MFM, Dimension 3100 (commercially available from Digital Instruments) and its analysis software are used. The measurement area of the MFM image is set to 10 μm×10 μm, and the 10 μm×10 μm measurement area is divided into 512×512(=262,144) measurement points. Three 10 μm×10 μm measurement areas at different locations are measured using the MFM, that is, three MFM images are obtained. From the obtained three MFM images, using analysis software bundled in Dimension 3100, the track width is measured at 10 locations, and an average value (simple average) is obtained. The average value is the data track width W. Here, the measurement conditions of the MFM are as follows: sweep rate: 1 Hz, chip used: MFMR-20, lift height: 20 nm, and correction: Flatten order 3.

The minimum value L of the distance between magnetization reversals is obtained as follows. The magnetic tape MT in which data is recorded on the entire surface is prepared, a data recording pattern of the data band DB part of the magnetic layer 43 is observed using a magnetic force microscope (MFM) to obtain an MFM image. As the MFM, Dimension 3100 (commercially available from Digital Instruments) and its analysis software are used. The measurement area of the MFM image is set to 2 μm×2 μm, and the 2 μm×2 μm measurement area is divided into 512×512 (=262,144) measurement points. Three 2 μm×2 μm measurement areas at different locations are measured using the MFM, that is, three MFM images are obtained. 50 inter-bit distances are measured from the two-dimensional unevenness chart of the recording pattern of the obtained MFM image. The inter-bit distance is measured using analysis software bundled in Dimension 3100. The value that is approximately the greatest common divisor of the measured 50 inter-bit distances is the minimum value L of the distance between magnetization reversals. Here, the measurement conditions are as follows: sweep rate: 1 Hz, chip used: MFMR-20, lift height: 20 nm, and correction: Flatten order 3.

The servo pattern is a magnetized area, which is formed by magnetizing a specific area of the magnetic layer 43 in a specific direction by a servo writer during magnetic tape production. In the servo band SB, an area in which no servo pattern is formed (hereinafter referred to as a "non-pattern area") may be a magnetized area in which the magnetic layer 43 is magnetized, or a non-magnetized area in which the magnetic layer 43 is not magnetized. When the non-pattern area is a magnetized area, the servo-pattern formed area and the non-pattern area may be magnetized in different directions (for example, in directions opposite to each other). The servo pattern (servo signal) includes longitudinal position of signal (LPOS) information. The LPOS information indicates the position of the magnetic tape MT in the longitudinal direction and is position information in the longitudinal direction for uniquely identifying each servo band SB.

Figure 5:
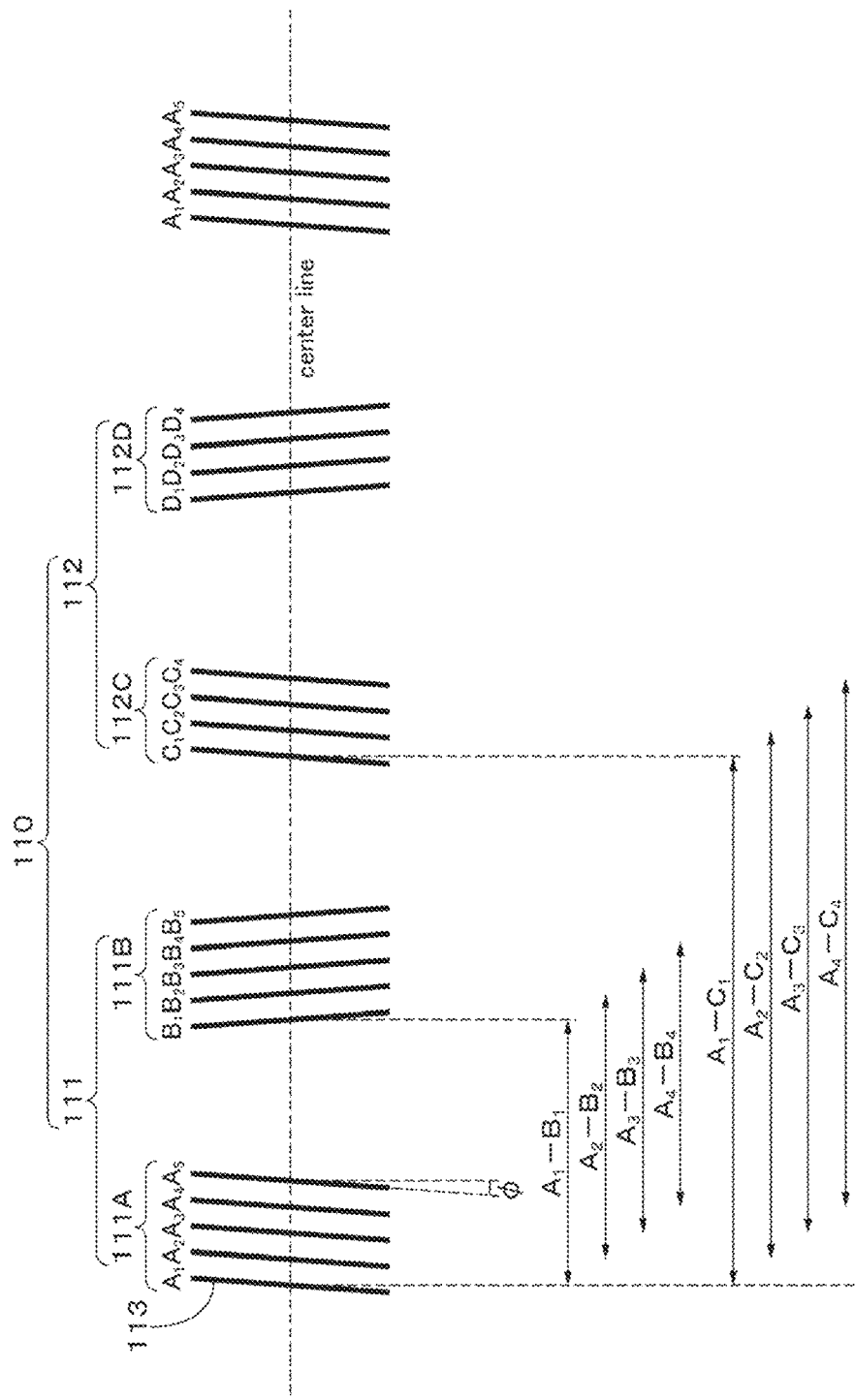
FIG. 5 is an enlarged view showing an example of a configuration of a servo band.

FIG. 5 is an enlarged view showing an example of a configuration of a servo band SB. In the LTO standard, a servo pattern including a plurality of servo stripes (linear magnetized area) 113 inclined with respect to the width direction of the magnetic tape MT is formed in the servo band SB.

The servo band SB includes a plurality of servo frames 110. Each servo frame 110 includes 18 servo stripes 113. Specifically, each servo frame 110 includes a servo subframe 1 (111) and a servo subframe 2 (112).

The servo subframe 1 (111) is composed of an A burst 111A and a B burst 111B. The B burst 111B is disposed adjacent to the A burst 111A. The A burst 111A includes five servo stripes 113 formed at specified intervals, which are inclined at a predetermined angle φ with respect to the width direction of the magnetic tape MT. In FIG. 5, these five servo stripes 113 are indicated by the reference numerals $A_1$, $A_2$, $A_3$, $A_4$, and $A_5$ from end of tape (EOT) to beginning of tape (BOT) of the magnetic tape MT. Like the A burst 111A, the B burst 111B includes five servo stripes 113 formed at specified intervals, which are inclined at a predetermined angle φ with respect to the width direction of the magnetic tape MT. In FIG. 5, these five servo stripes 113 are indicated by the reference numerals $B_1$, $B_2$, $B_3$, $B_4$, and $B_5$ from EOT to BOT of the magnetic tape MT. The servo stripe 113 of the B burst 111B is inclined in the direction opposite to the servo stripe 113 of the A burst 111A. That is, the servo stripe 113 of the A burst 111A and the servo stripe 113 of the B burst 111B are disposed in an inverted V-shape.

The servo subframe 2 (112) includes a C burst 112C and a D burst 112D. The D burst 112D is disposed adjacent to the C burst 112C. The C burst 112C includes four servo stripes 113 formed at specified intervals, which are inclined at a predetermined angle φ with respect to the width direction of the tape. In FIG. 5, these four servo stripes 113 are indicated by the reference numerals $C_1$, $C_2$, $C_3$, and $C_4$ from EOT to BOT of the magnetic tape MT. Like the C burst 112C, the D burst 112D includes four servo stripes 113 formed at specified intervals, which are inclined at a predetermined angle φ with respect to the width direction of the tape. In FIG. 5, these four servo stripes 113 are indicated by the reference numerals $D_1$, $D_2$, $D_3$, and $D_4$ from EOT to BOT of the magnetic tape MT. The servo stripe 113 of the D burst 112D and the servo stripe 113 of the C burst 112C are inclined in directions opposite to each other. That is, the servo stripe 113 of the C burst 112C and the servo stripe 113 of the D burst 112D are disposed in an inverted V-shape.

The predetermined angle φ of the servo stripe 113 in the A burst 111A, the B burst 111B, the C burst 112C, and the D burst 112D may be, for example, 5° to 25°, and particularly 11° to 25°.

When the servo band SB is read in the magnetic head 51, information for acquiring the tape speed and the vertical position of the magnetic head can be obtained. The tape speed is calculated from the time between four timing signals (A1-C1, A2-C2, A3-C3, A4-C4). The head position is calculated from the time between the four timing signals and the time between other four timing signals (A1-B1, A2-B2, A3-B3, A4-B4).

As shown in FIG. 5, it is preferable that the servo patterns (that is, the plurality of servo stripes 113) be linearly arranged in the longitudinal direction of the magnetic tape MT. That is, it is preferable for the servo band SB to have a linear shape in the longitudinal direction.

Figure 6:
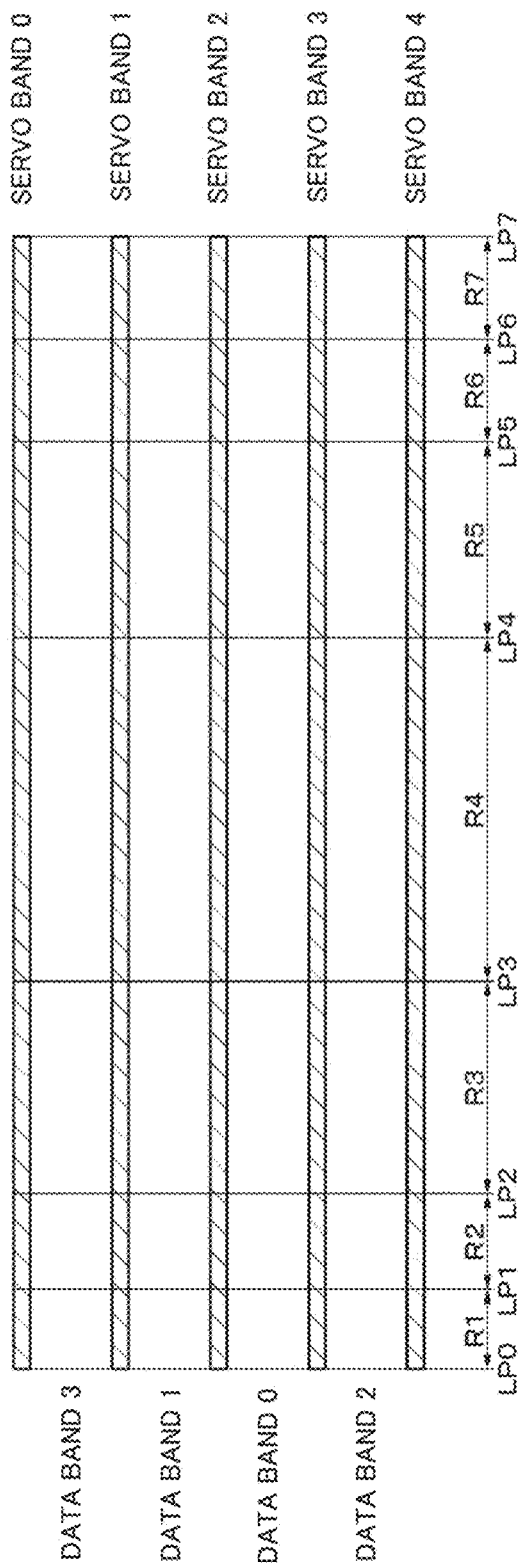
FIG. 6 is a schematic diagram showing an example of a format of a magnetic tape.

FIG. 6 is a schematic diagram showing an example of a format of the magnetic tape MT. The magnetic tape MT is divided into seven areas by eight logical points LP0 to LP7 in the longitudinal direction. LP0 to LP7 are set from one end on the winding end side to the other end on the winding start side of the magnetic tape MT in order. In addition, the magnetic tape MT is divided into five or more servo bands and 4 or more data bands in the width direction. Here, FIG. 6 shows an example in which the magnetic tape MT is divided into five servo bands and four data bands in the width direction.

The seven areas are composed of an unused area (an area between LP0-LP1) R1, a servo recognition area (an area between LP1-LP2) R2 in a forward direction, a calibration area (an area between LP2-LP3) R3, a user data area (an area between LP3-LP4) R4, an unused data area (an area between LP4-LP5) R5, a servo recognition area (an area between LP5-LP6) R6 in a reverse direction, and an unused area (an area between LP6-LP7) R7. In the following description, the servo recognition area R2, the calibration area R3, the user data area R4, the unused data area R5 and the servo recognition area R6 in a reverse direction may be collectively referred to as a used area.

In this specification, the "forward direction" is a running direction when the magnetic tape MT is sent out from the cartridge 10 and wound on the reel such as a servo writer. The "reverse direction" is a running direction when the magnetic tape MT is sent out from the reel such as a servo writer and wound on the cartridge 10.

In the used area, servo patterns that satisfy a standard are formed. In the servo patterns that satisfy a standard, the distance $D_{AC}$ between the A burst 111A and the C burst 112C and the distance $D_{CA}$ between the C burst 112C and the A burst 111A satisfy a standard. In this case, as shown in FIG. 7A, the tips of the B burst 111B and the C burst 112C are separated from each other, and the tips of the D burst 112D and the A burst 111A are separated from each other. Thereby, an inverted V-shaped servo pattern is formed. The servo pattern shown in FIG. 5 is an example of the servo patterns that satisfy a standard formed in the used area.

Servo patterns that do not satisfy a standard are formed in both the unused area R1 and the unused area R7. The servo patterns that do not satisfy a standard may be formed in a part of the unused area R1 or may be formed in the entire unused area R1. Similarly, the servo patterns that do not satisfy a standard may be formed in a part of the unused area R7 or may be formed in the entire unused area R7. As described above, the unused area R1 is provided at the end on the winding end side of the magnetic tape MT, and the unused area R7 is provided at the end on the winding start side of the magnetic tape MT.

In the servo-patterns that do not satisfy a standard, for example, the distance $D_{AC}$ between the A burst 111A and the C burst 112C, and the distance $D_{CA}$ between the C burst 112C and the A burst 111A may be narrower than the standard or wider than the standard.

When the magnetic tape MT runs in the forward direction, the unused area R1 becomes an area in which the magnetic tape MT is accelerated and runs. Therefore, when the servo signal is written by the same control as in the used area, the distance $D_{AC}$ between the A burst 111A and the C burst 112C and the distance $D_{CA}$ between the C burst 112C and the A burst 111A are narrower than the standard.

When the magnetic tape MT runs in the forward direction, the unused area R7 becomes an area in which the magnetic tape MT is decelerated and runs. Therefore, when the servo signal is written by the same control as in the used area, the distance $D_{AC}$ between the A burst 111A and the C burst 112C and the distance $D_{CA}$ between the C burst 112C and the A burst 111A are narrower than the standard.

When the distance $D_{AC}$ and the distance $D_{CA}$ are narrower than the standard, for example, as shown in FIG. 7B, the tips of the B burst 111B and the C burst 112C overlap each other so that a V-shaped servo pattern is formed with the B burst 111B and the C burst 112C. In addition, the tips of the D burst 112D and the A burst 111A overlap each other so that a V-shaped servo pattern is formed with the D burst 112D and the A burst 111A.

When the distance $D_{AC}$ and the distance $D_{CA}$ are narrower than the standard, for example, as shown in FIG. 7C, the B burst 111B and the C burst 112C intersect so that an X-shaped servo pattern is formed with the B burst 111B and the C burst 112C. In addition, the D burst 112D and the A burst 111A intersect so that an X-shaped servo pattern is formed with the D burst 112D and the A burst 111A.

Whether servo patterns that do not satisfy a standard are formed in the unused area R1 and the unused area R7 can be confirmed as follows. First, the cartridge 10 is disassembled, and the magnetic tape MT is taken out. Subsequently, servo patterns (that is, servo bands SB) formed in the magnetic layer 43 of the unused area R1 and the unused area R7 of the magnetic tape MT taken out are observed using a magnetic force microscope (MFM) to obtain an MFM image. As the MFM, Dimension 3100 (commercially available from Digital Instruments) and its analysis software are used. Next, it is checked whether servo patterns in the obtained MFM image satisfy a standard. In addition, after a ferricolloid developer (SigMarker Q commercially available from Sigma Hi-Chemical Inc.) is applied, checking can be performed using a microscope at a magnification of about 100 to 1,000.

In the conventional cartridge, servo signals that satisfy a standard are written in the unused area on the winding start side and the unused area on the winding end side. This is because, in the conventional cartridge preparing process, a magnetic tape on which servo patterns that satisfy a standard are written from one end to the other end in the longitudinal direction is assembled into a cartridge, and after the assembly, a process of rewriting servo signals is not performed.

4 CONFIGURATION OF SERVO WRITER FOR CARTRIDGE

Figure 8:
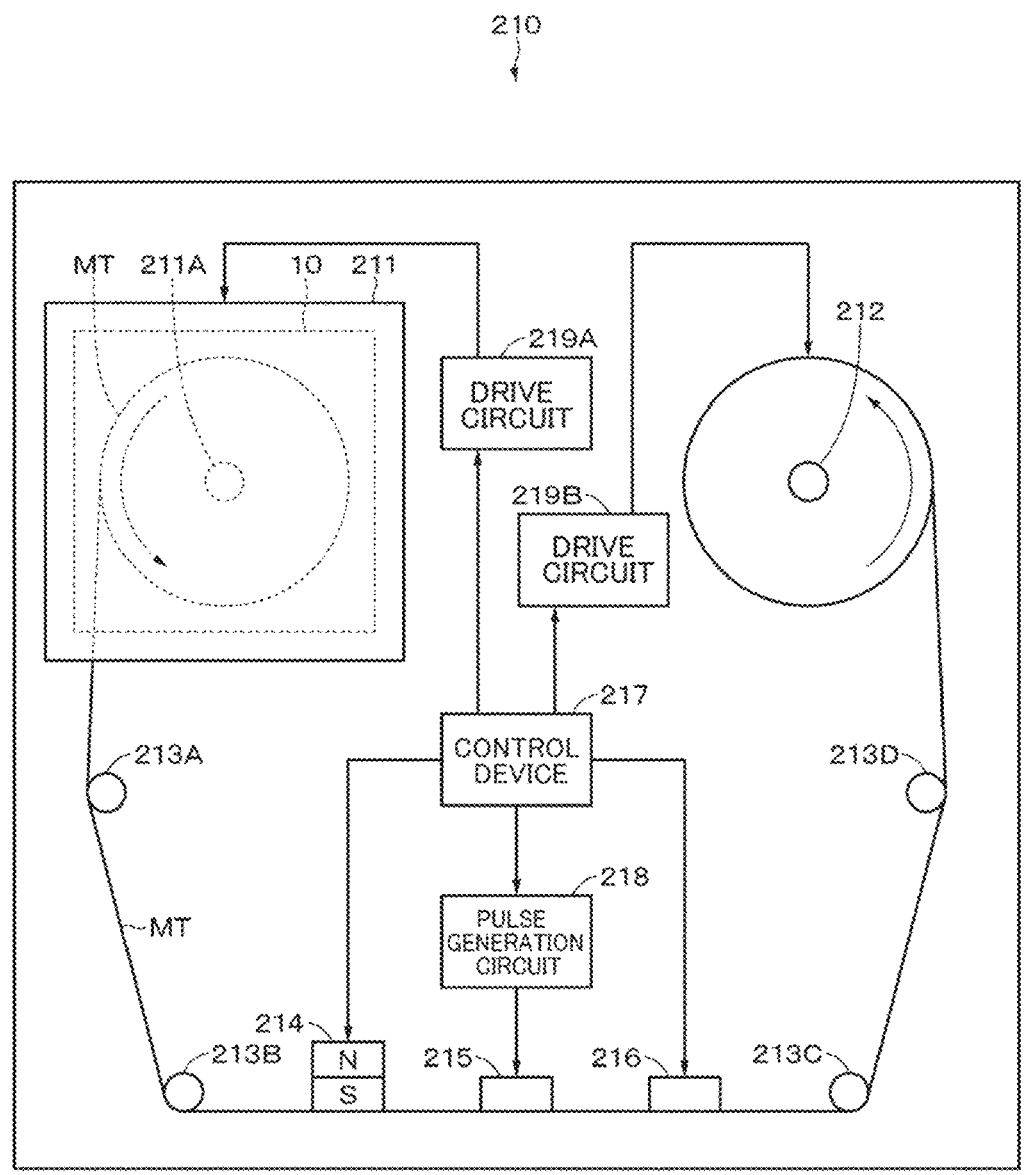
FIG. 8 is a schematic diagram showing an example of a configuration of a servo writer for a cartridge.

FIG. 8 is a schematic diagram showing an example of a configuration of a servo writer 210 for a cartridge. The servo writer 210 erases the servo signals written in the cartridge 10 and writes servo signals again. When the servo signals are rewritten, servo patterns that do not satisfy a standard (second servo patterns) are formed in the unused area R1 and the unused area R7.

The servo writer 210 includes a cartridge accommodating unit 211, a reel 212, guide rollers 213A, 213B, 213C, and 213D, a neutralization magnet 214, a servo signal writing head 215, a verification head 216, a control device 217, a pulse generation circuit 218, a spindle drive circuit 219A, a reel drive circuit 219B, and an operation unit (not shown).

The cartridge accommodating unit 211, the reel 212, and the guide rollers 213A, 213B, 213C, and 213D form a running unit. The running unit sends the tape-shaped magnetic tape MT out from the cartridge 10 when servo signals are written, and winds up the sent out magnetic tape MT on the reel 212 to cause the magnetic tape MT to run in the forward direction. In addition, after servo signals are written, the running unit sends the tape-shaped magnetic tape MT out from the reel 212, and winds up the sent out magnetic tape MT on the cartridge 10 to cause the magnetic tape MT to run in the reverse direction. In the following description, the "running path" is a path through which the magnetic tape MT runs in the servo writer 210. In addition, the "upstream side" and the "downstream side" indicate the upstream side and the downstream side of the running path when the magnetic tape MT runs in the forward direction.

(Cartridge Accommodating Unit)

In the cartridge accommodating unit 211, the cartridge 10 can be accommodated. The cartridge accommodating unit 211 includes a loading mechanism (not shown), and in which the cartridge 10 can be loaded. The cartridge accommodating unit 211 sends out the magnetic tape MT on which servo signals are rewritten. The cartridge accommodating unit 211 includes a spindle 241A. The spindle 241A has a configuration in which the cartridge 10 can be attached. When the spindle 241A rotates, the magnetic tape MT is sent out.

(Reel)

The reel 212 winds up the magnetic tape MT on which servo signals are rewritten. The tip (the leader pin 20) of the magnetic tape MT drawn out from the cartridge 10 can be fixed to the reel 212.

(Guide Rollers)

The guide rollers 213A and 213B are provided along the running path between the cartridge accommodating unit 211 and the servo signal writing head 215. Guide rollers 243A and 243B guide the magnetic tape MT that runs from the cartridge accommodating unit 211 to the servo signal writing head 215. Guide rollers 243C and 243D are provided along the running path between the servo signal writing head 215 and the reel 212. The guide rollers 243C and 243D guide running of the magnetic tape MT that runs the servo signal writing head 215 to the reel 212.

(Neutralization Magnet)

The neutralization magnet 214 is provided along the running path upstream from the servo signal writing head 215. The neutralization magnet 214 erases servo patterns (first servo pattern) formed in the magnetic tape MT that runs in the forward direction. The neutralization magnet 214 may be a magnet that can rotate as shown in Japanese Patent Application Publication No. 2018-005970, and can change a magnetic field applied to the magnetic layer 43 according to the rotation.

(Servo Signal Writing Head)

The servo signal writing head 215 is a magnetic head for forming servo patterns (second servo patterns) by rewriting servo signals to the magnetic tape from which the servo patterns are erased and which runs in the forward direction. As the servo signal writing head 215, for example, a head described in PTL 1 can be used.

The servo signal writing head 215 has a sliding surface that slides on the magnetic tape MT. The servo signal writing head 215 includes five or more recording elements, and at least one bottomed cavity (concave part) on the sliding surface. The recording element has magnetic gaps. The plurality of magnetic gaps are disposed in a row at predetermined intervals on the sliding surface to correspond to the positions of the servo bands in the width direction of the magnetic tape MT. In each of five or more recording elements, servo signals are written on the magnetic tape MT and thus five or more servo bands SB are formed.

The periphery of the bottomed cavity is closed, and the bottomed cavity is formed only within the running area width of the magnetic tape MT. If the bottomed cavity having such a configuration is provided on the sliding surface, when the magnetic tape MT runs, expansion of air between the sliding surface and the magnetic tape MT is promoted, the spacing is reduced, and the running stability of the magnetic tape MT is improved due to a lowered atmospheric pressure, that is, a negative pressure.

(Verification Head)

The verification head 216 is provided along the running path downstream from the servo signal writing head 215. The verification head 216 is a magnetic head that is in sliding contact with the magnetic tape MT on which servo signals are written and which runs in the forward direction and reads the servo signals written on the servo band SB. For example, the verification head 216 may have the same configuration as the servo signal writing head 215 except that a plurality of reproducing elements are provided in place of the plurality of recording elements.

(Control Device)

The control device 217 is device that controls operations of respective parts of the servo writer 210, and includes a central processing unit (CPU), various storage devices and the like. The control device 217 controls the servo signal writing head 215 so that servo signals are written in an accelerated running period and a decelerated running period of the magnetic tape MT, and servo patterns that do not satisfy a standard are formed in the magnetic tape MT. The control device 217 controls the servo signal writing head 215 so that servo signals are written in a certain speed running period of the magnetic tape MT, and servo patterns that satisfy a standard are formed in the magnetic tape MT.

The control device 217 generates a pulse control signal for controlling a current value, a pulse width and a generation timing of a recording pulse current so that the servo signals written on the magnetic tape MT by the servo signal writing head 215 form specified servo patterns, and supplies the signal to the pulse generation circuit 218.

The control device 217 inspects whether a servo signal is appropriately recorded in the magnetic tape MT based on the servo signal supplied from the verification head 216. Specifically, the control device 217 stores information on the servo signals that satisfy a standard (hereinafter referred to as "standard information") in the storage device, compares the standard information with the servo signals supplied from the verification head 216, and inspects whether servo signals are appropriately recorded in the magnetic tape MT.

The control device 217 moves the neutralization magnet 214, brings it into contact with the magnetic tape MT, and erases the servo signals written on the magnetic tape MT.

The control device 217 controls the spindle drive circuit 219A, and drives a spindle 211A such that it rotates. The control device 217 controls the reel drive circuit 219B and drives the reel 212 such that it rotates. Specifically the control device 217 generates a motor current signal for controlling motor currents of the spindle drive circuit 219A and the reel drive circuit 219B in order to control a running speed of the magnetic tape MT when servo signals are written, and supplies the signal to the spindle drive circuit 219A and the reel drive circuit 219B.

(Operation Unit)

The operation unit is used to operate the servo writer 210 and execute a servo write operation and the like. The operation unit is connected to the control device 217.

(Pulse Generation Circuit)

The pulse generation circuit 218 generates a recording pulse current based on the pulse control signal supplied from the control device 217 and supplies the current to the servo signal writing head 215.

(Spindle Drive Circuit)

The spindle drive circuit 219A rotates the spindle 211A based on the control of the control device 217. The spindle drive circuit 219A is a device for driving the spindle 211A such that it rotates, and includes a motor integrated with the spindle 211A, a motor drive circuit for supplying a current to the motor, and the like. In the spindle drive circuit 219A, the motor drive circuit generates a motor current based on the motor current signal supplied from the control device 217, and when the motor current is supplied to the motor, the spindle 211A is driven such that it rotates.

(Reel Drive Circuit)

The reel drive circuit 219B rotates the reel 212 based on the control of the control device 217. The reel drive circuit 219B is a device for driving the reel 212 such that it rotates, and includes a motor, a motor drive circuit for supplying a current to the motor, a gear for connecting a motor shaft to the reel 212, and the like. In the reel drive circuit 219B, the motor drive circuit generates a motor current based on the motor current signal supplied from the control device 217, and when the motor current is supplied to the motor, rotational driving power of the motor is transmitted to the reel 212 via the gear, and the reel 212 is driven such that it rotates.

5 OPERATION OF SERVO WRITER FOR CARTRIDGE

Hereinafter, an example of the operation of the servo writer 210 having the above configuration will be described.

First, an operator loads the cartridge 10 into the cartridge accommodating unit 211. After the loading, the magnetic tape MT is drawn out from the cartridge 10 by the operator, and the tip thereof (the leader pin 20) is fixed to the reel 212. Here, the cartridge 10 accommodated in the cartridge accommodating unit 211 may be a cartridge in which it has been confirmed that the magnetic tape MT has poor quality.

Next, when the operator operates the operation unit (not shown), the control device 217 brings the neutralization magnet 214 into contact with the magnetic tape MT. The control device 217 controls rotation of the spindle 211A and the reel 212 via the spindle drive circuit 219A and the reel drive circuit 219B, sends the magnetic tape out from the cartridge 10, and winds up the sent out magnetic tape MT with the reel 212. Thereby, the magnetic tape MT is accelerated and runs in the forward direction. The neutralization magnet 214 erases the servo patterns (that is, the servo signals written on the magnetic tape MT) formed in the magnetic tape MT that runs in the forward direction.

Next, the control device 217 erases the servo patterns (that is, the servo signals written on the magnetic tape MT) formed in the unused area R1 of the magnetic tape MT that runs in the forward direction by the neutralization magnet 214 in an accelerated running period of the magnetic tape MT. Next, the control device 217 controls the servo signal writing head 215 so that servo signals are written in an accelerated running period of the magnetic tape MT, and servo patterns that do not satisfy a standard are formed in the unused area R1 of the magnetic tape that runs in the forward direction.

Next, when the running speed of the magnetic tape MT reaches a specified running speed, the control device 217 controls rotation of the spindle 211A and the reel 212 via the spindle drive circuit 219A and the reel drive circuit 219B, and causes the magnetic tape MT to run in the forward direction at a certain specified speed.

Next, the control device 217 erases the servo patterns (that is, the servo signals written on the magnetic tape MT) formed in the used area of the magnetic tape MT that runs in the forward direction by the neutralization magnet 214 in a certain speed running period of the magnetic tape MT. Next, in a certain speed running period of the magnetic tape MT, the control device 217 rewrites servo signals in the used area of the magnetic tape MT that runs in the forward direction by the servo signal writing head 215 and forms servo patterns that satisfy a standard. The servo signal includes LPOS information, and when the servo signal is rewritten, the LPOS information is also written on the servo band SB.

Next, the control device 217 reads the servo signal from the magnetic tape MT that runs in the forward direction by the verification head 216 in a certain speed running period of the magnetic tape MT, and checks whether the servo signal is appropriately written based on the read servo signal.

Next, when a specified length of the magnetic tape MT is wound on the cartridge 10, the control device 217 controls rotation of the spindle 211A and the reel 212 via the spindle drive circuit 219A and the reel drive circuit 219B, and causes the magnetic tape MT to decelerate and run in the forward direction.

Next, the control device 217 erases the servo patterns (that is, the servo signals written on the magnetic tape MT) formed in the unused area R7 of the magnetic tape MT that runs in the forward direction by the neutralization magnet 214 in a decelerated running period of the magnetic tape MT. Next, in a decelerated running period of the magnetic tape MT, the control device 217 controls the servo signal writing head 215 so that servo signals are written, and servo patterns that do not satisfy a standard are formed in the unused area R7 of the magnetic tape that runs in the forward direction.

Next, when the magnetic tape MT stored in the cartridge 10 is completely sent out, the control device 217 stops rotation and driving of the spindle 211A and the reel 212 via the spindle drive circuit 219A and the reel drive circuit 219B. Thereby, running of the magnetic tape MT is stopped. Next, the control device 217 stops a neutralization function by separating the neutralization magnet 214 from the magnetic tape MT. Next, the control device 217 controls rotation of the spindle 211A and the reel 212 via the spindle drive circuit 219A and the reel drive circuit 219B, sends the magnetic tape MT out from the reel 212, and wound up the sent out magnetic tape MT around the cartridge 10.

Next, when the magnetic tape MT wound on the reel 212 is completely sent out and wound on the cartridge 10, the control device 217 stops rotation and driving of the spindle 211A and the reel 212 via the spindle drive circuit 219A and the reel drive circuit 219B. Then, the control device 217 unloads the cartridge 10 from the cartridge accommodating unit 211 in response to the operation of the operation unit.

6 CONFIGURATION OF SERVO SIGNAL RECORDING SYSTEM

Figure 9:
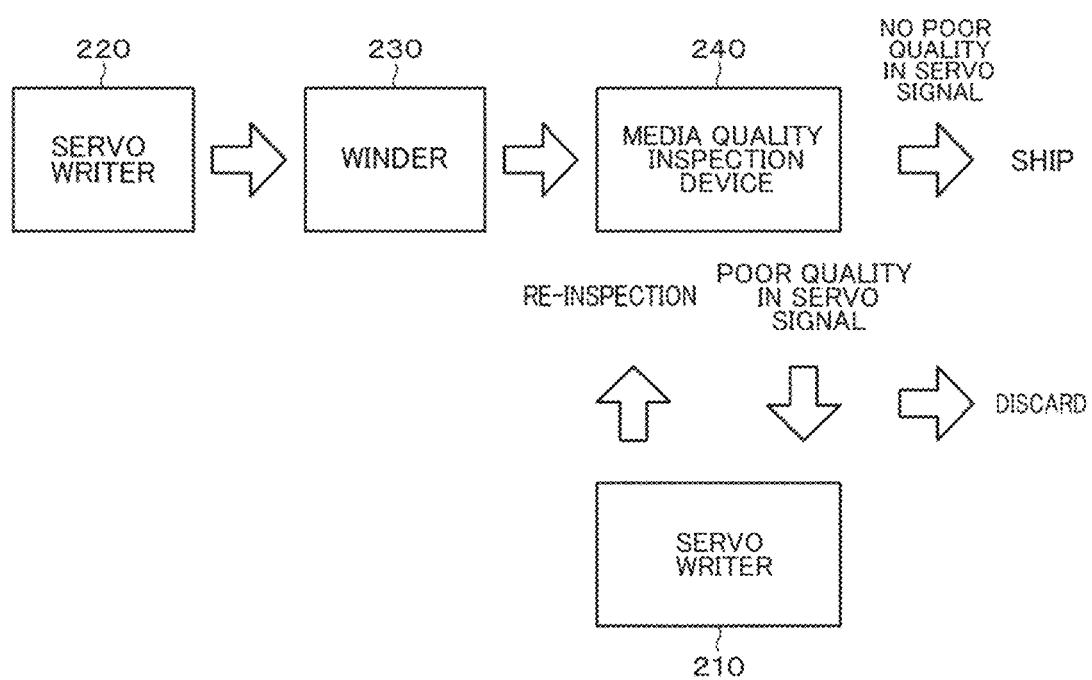
FIG. 9 is a schematic diagram showing an example of a configuration of a servo signal recording system.

FIG. 9 is a schematic diagram showing an example of a configuration of a servo signal recording system. The servo signal recording system includes a servo writer 220 for a pancake, a winder 230, a quality inspection device 240, and the servo writer 210 for a cartridge. Here, the "pancake" is a magnetic tape MT wound in a roll shape (a wound magnetic tape MT) before it is cut to a specified length.

The servo writer 210 for a cartridge is as described above, and the servo writer 210 for a pancake, the winder 230, and the quality inspection device 240 will be described below.

(Servo Writer for Pancake)

Figure 10:
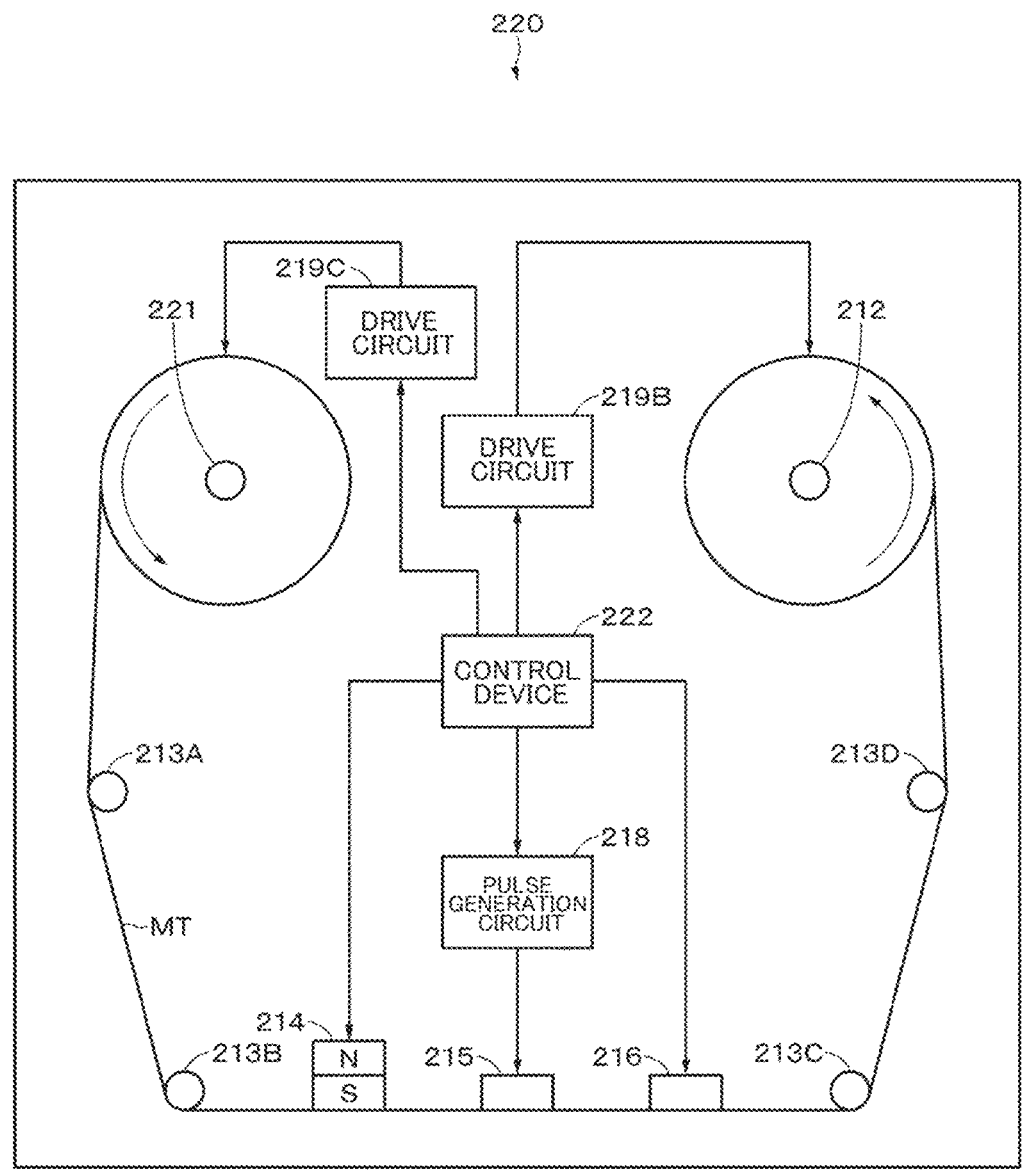
FIG. 10 is a schematic diagram showing an example of a configuration of a servo writer for a pancake.

FIG. 10 is a schematic diagram showing an example of a configuration of the servo writer 220 for a pancake. The servo writer 220 has a configuration in which servo signals can be written on the magnetic tape MT as a pancake.

The servo writer 220 includes reels 221 and 212, the guide rollers 213A, 213B, 213C, and 213D, the neutralization magnet 214, the servo signal writing head 215, the verification head 216, a control device 222, the pulse generation circuit 218, a reel drive circuit 219C, the reel drive circuit 219B, and the operation unit (not shown). Here, in the servo writer 220, the same parts as those of the servo writer 210 are denoted with the same reference numerals, and descriptions thereof will be omitted.

The reel 221 has a configuration in which the magnetic tape MT as a pancake can be attached. The reel 221 sends out the magnetic tape MT for writing servo signals.

The control device 222 controls rotation of the reel 212 and the reel 212 via the reel drive circuit 219C and the reel drive circuit 219B and causes the magnetic tape MT to run in the forward direction at a certain specified speed. In an accelerated running period and a decelerated running period of the magnetic tape MT, the control device 222 may control the servo signal writing head 215 so that no servo signals are written, or may control the servo signal writing head 215 so that servo signals are written. However, unlike the control device 217, the control device 222 does not have a function of running the magnetic tape MT in the reverse direction.

The operation unit is used to operate the servo writer 220 and execute a servo write operation and the like. The operation unit is connected to the control device 222.

(Winder)

Figure 11:
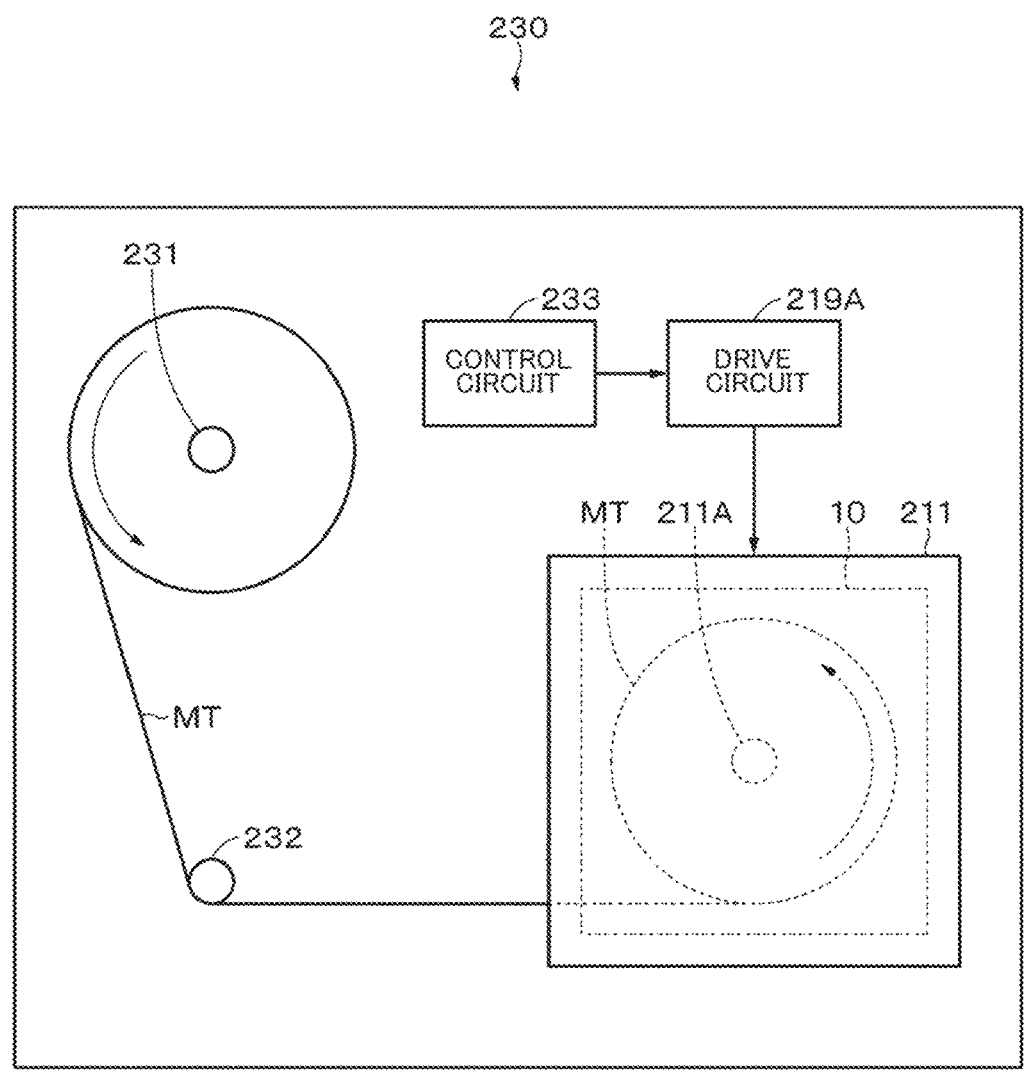
FIG. 11 is a schematic diagram showing an example of a configuration of a winder.

FIG. 11 is a schematic diagram showing an example of a configuration of the winder 230. The winder 230 assembles the magnetic tape MT on which servo signals are written into the cartridge case 12. The winder 230 includes a reel 231, a guide roller 232, the cartridge accommodating unit 211, a control device 233, the spindle drive circuit 219A, and the operation unit (not shown). Here, in the winder 230, the same parts as those of the servo writer 210 are denoted with the same reference numerals, and descriptions thereof will be omitted.

The reel 231 has a configuration in which the magnetic tape MT as a pancake on which servo signals are written can be attached. The reel 231 sends out the magnetic tape MT for writing servo signals. The guide roller 232 is provided along the running path between the reel 231 and the cartridge accommodating unit 211. The guide roller 232 guides the magnetic tape MT that runs from the reel 231 to the cartridge accommodating unit 211. The control device 233 controls the spindle drive circuit 219A and drives the spindle 211A such that it rotates. Thereby, the magnetic tape MT is sent out from the reel 231, and the sent out magnetic tape MT is wound on the cartridge 10.

The operation unit is used to operate the winder 230 and execute a winding operation of the magnetic tape MT and the like. The operation unit is connected to the control device 233.

(Quality Inspection Device)

The quality inspection device 240 inspects the quality of the servo signal of the magnetic tape MT assembled into the cartridge case 12. Examples of poor quality of servo signals include missing of servo signals and poor servo tracking characteristics.

7 OPERATION OF SERVO SIGNAL RECORDING SYSTEM

Hereinafter, an example of the operation of the servo signal recording system having the above configuration will be described.

(Servo Signal Writing Process)

Servo signals are written on the magnetic tape MT cut to a specified width using the servo writer 220 as follows. First, the operator attaches the magnetic tape MT as a pancake to the reel 221, draws out the tip of the magnetic tape MT on the outer peripheral side, and fixes it to the reel 212. Next, when the operator operates the operation unit (not shown), the control device 222 controls rotation of the reel 212 via the reel drive circuit 219B, sends the magnetic tape MT out from the cartridge 10, and winds up the sent out magnetic tape MT with the reel 212. Thereby, the magnetic tape MT runs in the forward direction.

Next, the control device 222 erases the magnetic tape MT that runs in the forward direction by the neutralization magnet 214 and then writes servo signals in the magnetic tape MT that runs in the forward direction by the servo signal writing head 215, and forms servo patterns. Next, the control device 222 reads the written servo signals from the magnetic tape MT that runs in the forward direction by the verification head 216, and checks whether the servo signal is appropriately written based on the read servo signal.

Next, when the magnetic tape MT as a pancake is completely sent out, the control device 222 stops rotation and driving of the reel 212 via the reel drive circuit 219B. Thereby, transfer of the magnetic tape MT is stopped. Then, the operator removes the magnetic tape MT as a pancake on which servo signals are written from the reel 212, and transfers it to the winder 230.

(Assembling Process)

The magnetic tape MT on which servo signals are written is assembled into the cartridge 10 using the winder 230 as follows. First, the operator attaches the magnetic tape MT as a pancake to the reel 231, and the cartridge 10 is loaded into the cartridge accommodating unit 211. Next, the tip of the magnetic tape MT on the outer peripheral side attached to the reel 231 is drawn out, and fixed to the reel 13 (refer to FIG. 1) of the cartridge 10.

Next, when the operator operates the operation unit (not shown), the control device 233 controls rotation and driving of the spindle 211A via the spindle drive circuit 219A, sends the magnetic tape MT out from the reel 231, and winds up the sent out magnetic tape MT on the cartridge 10.

Next, when a specified length of the magnetic tape is wound on the cartridge 10, the control device 233 stops rotation of the spindle 211A via the spindle drive circuit 219A. Thereby, transfer of the magnetic tape MT is stopped. Then, the control device 233 unloads the cartridge 10 from the cartridge accommodating unit 211 in response to the operation of the operation unit. The operator transfers the unloaded cartridge 10 to the quality inspection device 240.

Here, when servo patterns that do not satisfy a standard are formed in parts within a predetermined range from both ends of the magnetic tape MT as a pancake in the longitudinal direction, these parts may be cut out and removed from the magnetic tape MT in this assembling process. Alternatively, when servo patterns are not formed in parts within a predetermined range from both ends of the magnetic tape MT as a pancake in the longitudinal direction, these parts may be cut out and removed from the magnetic tape MT in this assembling process.

(Quality Inspection Process)

The quality of the servo signal of the magnetic tape MT assembled into the cartridge 10 is inspected using the quality inspection device 240. As a result of inspection, when no poor quality is confirmed in the magnetic tape MT, the cartridge 10 is shipped. On the other hand, as a result of inspection, when the poor quality is confirmed in the magnetic tape MT, the cartridge 10 is transferred to the servo writer 210. Then, servo signals are rewritten on the magnetic tape MT according to a "servo signal rewriting process" to be described below, and servo patterns (that is, servo bands SB) are formed. After the servo signals are rewritten, the quality of the servo signal of the magnetic tape MT assembled into the cartridge 10 is inspected again using the quality inspection device 240.

Even after the "servo signal rewriting process" is performed a specified number of times (for example, three times), when the quality inspection device 240 confirms that the quality of the servo signal is poor, the operator discards the cartridge 10.

(Servo Signal Rewriting Process)

Servo signals are rewritten on the magnetic tape MT of the cartridge 10 using the servo writer 210. The details of this process are the same as described in the above [5 Operation of servo writer for cartridge].

The quality inspection process is preferably performed after a specified time has elapsed from when the magnetic tape MT is assembled into the cartridge 10. That is, servo signals are preferably rewritten after a specified time has elapsed from when the magnetic tape MT is assembled into the cartridge 10. As described above, when quality inspection is performed, that is, servo signals are rewritten, after a specified time has elapsed, the width size of the magnetic tape MT is stabilized, and servo signals can be then recorded in the magnetic tape MT. Therefore, the size change of the intervals between the servo bands SB is reduced. The lower limit value of the specified time is preferably 1 day or longer, more preferably 3 days or longer, and still more preferably 7 days or longer. When the lower limit value of the specified time is 1 day or longer, it is possible to effectively stabilize the width size of the magnetic tape MT. The upper limit value of the specified time is, for example, 30 days or shorter or 15 days or shorter, and preferably 7 days or shorter. When the upper limit value of the specified time is 7 days or shorter, it is possible to minimize a decrease in the productivity.

After the assembling process, and before the quality inspection process, an annealing treatment may be performed on the cartridge 10. When the annealing treatment is performed in this manner, the width size of the magnetic tape MT is stabilized and servo signals can be then recorded in the magnetic tape MT. In order to stabilize the width size of the magnetic tape MT, the annealing treatment is preferably performed for the specified time. The temperature of the annealing treatment is preferably 23° C. or higher and 70° C. or lower.

8 EFFECTS

As described above, the servo writer 210 according to one embodiment of the present disclosure includes a running unit that sends the magnetic tape MT out from the cartridge 10, winds up the sent out magnetic tape MT, and runs the magnetic tape MT, the neutralization magnet 214 that erases a first servo pattern formed in the magnetic tape MT that runs, the servo signal writing head 215 that writes servo signals in the running magnetic tape MT from which the first servo pattern is erased and forms a second servo pattern, and the control device 217 that controls the servo signal writing head 215 so that servo signals are written in both an accelerated running period and a decelerated running period of the magnetic tape MT, and forms a second servo pattern that does not satisfy a standard in the magnetic tape MT. Thereby, in the cartridge 10 in which it has been confirmed that the quality of the servo signal is poor, servo signals can be rewritten. Therefore, it is possible to reduce the number of cartridges 10 discarded. Therefore, it is possible to improve the productivity with respect to the cartridge 10.

In consideration of the performance of the servo signal, when servo signals are read in a drive, two servo signal reading elements (sensors) shown in 51A and 51B (refer to FIG. 3) are used, and due to the influence of the temperature, the humidity, the winding pressure in the cartridge 10, and the like, the width size of the tape, in other words, the interval between the servo bands SB (servo band pitch), generally changes in the direction of widening. As a result, the position of the recording/reproducing element may be deviated and it may be difficult to read the data track Tk.

On the other hand, as in the above embodiment, after the cartridge 10 is wound and then stored for a specified time (for example, after stored for several days), when the width size of the magnetic tape MT is stabilized and servo signals are then recorded, the size change of the interval between the servo bands SB is reduced. Therefore, the positional deviation of the recording/reproducing element can be reduced, the reading accuracy of the data track Tk can be improved, and a high track density can be realized.

When the magnetic tape MT runs, an accelerated area is required at the end on the unwinding side, and a decelerated area is required at the end on the winding end side. When recording current patterns at certain intervals are applied to the accelerated area and the decelerated area, servo patterns that do not satisfy a standard can be formed. On the other hand, in order to form servo patterns that satisfy a standard, it is necessary to change the time interval of recording patterns in synchronization of the recording current patterns with the feed position of the magnetic tape MT, which has high technical difficulty. In the servo writer 210 according to the above embodiment, since servo patterns that do not satisfy a standard are recorded in in the unused area R1 and the unused area R7 area, it is possible to avoid the above difficulty. In addition, a pulse generation circuit that is used in the related art in the servo writer for a pancake and the like can be used as the pulse generation circuit 218.

9 MODIFICATION EXAMPLES

Modification Example 1

In the above embodiment, a case in which servo signals that do not satisfy a standard are written in the unused area R1 and the unused area R7 has been described, but servo patterns may not be formed in the unused area R1 and the unused area R7. In this case, the servo pattern may not be formed in a part of the unused area R1, or may not be formed in the entire unused area R1. Similarly, the servo pattern may not be formed in a part of the unused area R7, or may not be formed in the entire unused area R7.

The unused area R1 and the unused area R7 described above are formed as follows when the servo writer 210 rewrites servo signals. The control device 217 controls the servo signal writing head 215 so that no servo signals are written in an accelerated running period and a decelerated running period when the magnetic tape MT runs in the forward direction.

As described above, when servo patterns are prevented from being formed in the unused area R1 and the unused area R7, it is no longer necessary to produce a pulse generation circuit that can change the recording pulse time in synchronization with the feed position of the tape, which can be said to be technically impossible, and a pulse generation circuit that is used in the related art can be used as the pulse generation circuit 218.

Modification Example 2

In one area between the unused area R1 and the unused area R7, servo signals that do not satisfy a standard may be written, and in the other area, servo signals may not be written.

The unused area R1 and the unused area R7 described above are formed as follows when the servo writer rewrites servo signals. The control device 217 controls the servo signal writing head 215 so that servo signals are written in one period between an accelerated running period and a decelerated running period when the magnetic tape MT runs in the forward direction, controls the servo signal writing head 215 so that no servo signals are written in the other period whereas servo patterns that do not satisfy a standard are formed in the magnetic tape MT, and does not form servo patterns in the magnetic tape MT.

Modification Example 3

In the above embodiment, a case in which the servo writer 210 for a cartridge is used to rewrite servo signals has been described, but the servo writer 210 for a cartridge may be used for initial servo signal writing. In this case, after a specified time has elapsed from when the magnetic tape MT is assembled into the cartridge 10, initial servo signal writing is preferably performed. After the assembling process, and before the quality inspection process, an annealing treatment is preferably performed on the cartridge 10. In order to stabilize the width size of the magnetic tape MT, an annealing treatment is preferably performed for the specified time.

While embodiments and modification examples of the present disclosure have been described above in detail, the present disclosure is not limited to the above embodiments and modification examples, and various modifications based on the technical idea of the present disclosure can be made. For example, the configurations, methods, processes, shapes, materials, numerical values and the like exemplified in the above embodiments and modification examples are only examples, and as necessary, different configurations, methods, processes, shapes, materials, numerical values and the like may be used. The configurations, methods, processes, shapes, materials, numerical values and the like of the above embodiments and modification examples can be combined with each other as long as they do not deviate from the gist of the present disclosure.

The chemical formulas of the compounds and the like exemplified in the above embodiments and modification examples are representative, and a general name of the same compound is not limited to the listed valences and the like. In the numerical ranges stated in stages in the above embodiments and modification examples, the upper limit value or the lower limit value of the numerical range of a certain stage may be replaced with the upper limit value or the lower limit value in the numerical range of another stage. Unless otherwise specified, the materials exemplified in the above embodiments and modification examples may be used alone or two or more thereof may be used in combination.

In addition, the present disclosure may have the following configurations.

(1)
A servo writer, including:
a running unit that sends a tape-like magnetic recording medium out from a cartridge, winds up the sent out magnetic recording medium, and runs the magnetic recording medium;
an erasing unit that erases a first servo pattern formed in the magnetic recording medium that runs;
a head that writes a servo signal in the running magnetic recording medium from which the first servo pattern is erased and forms a second servo pattern; and
a control unit that controls the head so that the servo signal is written in at least one period of an accelerated running period and a decelerated running period of the magnetic recording medium, and forms the second servo pattern that does not satisfy a standard in the magnetic recording medium.

(2)
A servo writer, including:
a running unit that sends a tape-like magnetic recording medium out from a cartridge, winds up the sent out magnetic recording medium, and runs the magnetic recording medium;
an erasing unit that erases a first servo pattern formed in the magnetic recording medium that runs;
a head that writes a servo signal in the running magnetic recording medium from which the first servo pattern is erased and forms a second servo pattern; and
a control unit that controls the head so that the servo signal is not written in at least one period of an accelerated running period and a decelerated running period of the magnetic recording medium.

(3)
The servo writer according to (1) or (2),
wherein the head includes five or more recording elements.

(4)
The servo writer according to (3),
wherein five or more servo bands are formed when each of the five or more recording element writes the servo signal in the magnetic recording medium, and
wherein the servo signal includes information for uniquely identifying each of the servo bands.

(5)
A cartridge, including:
a wound tape-like magnetic recording medium; and
a case in which the magnetic recording medium is accommodated,
wherein the magnetic recording medium has an unused area, and
wherein, in the unused area, a servo pattern that does not satisfy a standard is formed or a servo pattern is not formed.

(6)
The cartridge according to (5),
wherein the unused area includes
a first unused area that is provided on a winding end side of the magnetic recording medium, and
a second unused area that is provided on a winding start side of the magnetic recording medium.

(7)
The cartridge according to (5) or (6),
wherein the magnetic recording medium includes five or more servo bands (8)
The cartridge according to (7),
wherein the five or more servo bands include information for uniquely identifying each of the servo bands.

(9)
The cartridge according to any one of (5) to (8),
wherein the magnetic recording medium has a magnetic layer, and
wherein the squareness ratio of the magnetic layer in a vertical direction is 65% or more.

(10)
The cartridge according to (9),
wherein the magnetic layer contains a magnetic powder, and
wherein the magnetic powder contains hexagonal ferrite, ε-iron oxide or Co-containing spinel ferrite.

(11)
A servo pattern writing method, including:
assembling a tape-like magnetic recording medium into a cartridge; and
forming a servo pattern in the magnetic recording medium after a specified time has elapsed from when the magnetic recording medium is assembled into the cartridge.

(12)
The servo pattern writing method according to (11),
wherein the forming the servo pattern in the magnetic recording medium includes
controlling a head so that a servo signal is written in at least one period of an accelerated running period and a decelerated running period of the magnetic recording medium, and forming a servo pattern that does not satisfy a standard in the magnetic recording medium.

(13)
The servo pattern writing method according to (11),
wherein the forming the servo pattern in the magnetic recording medium includes
sending the magnetic recording medium out from the cartridge, winding the sent out magnetic recording medium, and running the magnetic recording medium,
erasing a first servo pattern formed in the magnetic recording medium that runs, and
writing a servo signal by a head in the running magnetic recording medium from which the first servo pattern is erased and forming a second servo pattern,
wherein the forming of the second servo pattern includes
controlling the head so that the servo signal is written in at least one period of an accelerated running period and a decelerated running period of the magnetic recording medium, and forming the second servo pattern that does not satisfy a standard in the magnetic recording medium.

(14)
A cartridge producing method, including:
assembling a tape-like magnetic recording medium into a cartridge; and
forming a servo pattern in the magnetic recording medium after a specified time has elapsed from when the magnetic recording medium is assembled into the cartridge.

(15)
The cartridge producing method according to (14),
wherein the forming of the servo pattern in the magnetic recording medium includes
controlling a head so that a servo signal is written in at least one period of an accelerated running period and a decelerated running period of the magnetic recording medium, and forming a servo pattern that does not satisfy a standard in the magnetic recording medium.

(16)
The cartridge producing method according to (14),
wherein the forming the servo pattern in the magnetic recording medium includes
sending the magnetic recording medium out from the cartridge, winding the sent out magnetic recording medium, and running the magnetic recording medium,
erasing a first servo pattern formed in the magnetic recording medium that runs, and
writing a servo signal by a head in the running magnetic recording medium from which the first servo pattern is erased and forming a second servo pattern,
wherein the forming of the second servo pattern includes
controlling the head so that the servo signal is written in at least one period of an accelerated running period and a decelerated running period of the magnetic recording medium, and forming the second servo pattern that does not satisfy a standard in the magnetic recording medium.

REFERENCE SIGNS LIST

10 Cartridge
11 Cartridge memory
12 Cartridge case
41 Substrate
42 Underlayer
43 Magnetic layer
44 Back layer
110 Servo frame
111 Servo subframe 1
111A A burst
111B B burst
112 Servo subframe 2
112C C burst
112D D burst
113 Servo stripe
210, 220 Servo writer
211 Cartridge accommodating unit
211A Spindle
212 Reel
213A, 213B, 213C, 213D Guide roller
214 Neutralization magnet
215 Servo signal writing head
216 Verification head
217 Control device
218 Pulse generation circuit
219A Spindle drive circuit
219B, 219C Reel drive circuit
230 Winder
240 Quality inspection device
MT Magnetic tape
SB Servo band
DB Data bind

The invention claimed is:
1. A servo writer, comprising:
a running unit that sends a magnetic recording medium, in a tape form, out from a cartridge, winds up the sent out magnetic recording medium, and runs the magnetic recording medium;
an erasing unit that erases a first servo pattern formed in the magnetic recording medium that runs;
a head that writes a servo signal in the running magnetic recording medium from which the first servo pattern is erased and forms a second servo pattern; and
a control unit that controls the head so that the servo signal is written in at least one period of an accelerated running period and a decelerated running period of the magnetic recording medium, and forms the second servo pattern that does not satisfy a standard in the magnetic recording medium,
wherein the magnetic recording medium includes:
a ratio $R_S=(((\text{a servo bandwidth } W_{SB})\times(\text{a number of servo bands}))/(\text{a width of the magnetic recording medium}))\times 100$,
wherein the ratio $R_S$ is 4% or less,
wherein the servo bandwidth $W_{SB}$ is 99 μm or less, and
wherein the number of servo bands is 5 or more.
2. The servo writer according to claim 1,
wherein the head includes five or more recording elements.
3. The servo writer according to claim 2,
wherein five or more servo bands are formed when each of the five or more recording element writes the servo signal in the magnetic recording medium, and
wherein the servo signal includes information for uniquely identifying each of the servo bands.
4. A servo writer, comprising:
a running unit that sends a magnetic recording medium, in a tape form, out from a cartridge, winds up the sent out magnetic recording medium, and runs the magnetic recording medium;
an erasing unit that erases a first servo pattern formed in the magnetic recording medium that runs;

a head that writes a servo signal in the running magnetic recording medium from which the first servo pattern is erased and forms a second servo pattern; and a control unit that controls the head so that the servo signal is not written in at least one period of an accelerated running period and a decelerated running period of the magnetic recording medium, wherein the magnetic recording medium includes:

a ratio $R_S$=(((a servo bandwidth $W_{SB}$)×(a number of servo bands))/(a width of the magnetic recording medium))× 100, wherein the ratio $R_S$ is 4% or less, wherein the servo bandwidth $W_{SB}$ is 99 μm or less, and wherein the number of servo bands is 5 or more.

5. A cartridge, comprising:

a magnetic recording medium in a wound tape form; and a case in which the magnetic recording medium is accommodated, wherein the magnetic recording medium has an unused area, and wherein, in the unused area, a servo pattern that does not satisfy a standard is formed or a servo pattern is not formed, wherein the magnetic recording medium includes:

a ratio $R_S$=(((a servo bandwidth $W_{SB}$)×(a number of servo bands))/(a width of the magnetic recording medium))× 100, wherein the ratio $R_S$ is 4% or less, wherein the servo bandwidth $W_{SB}$ is 99 μm or less, and wherein the number of servo bands is 5 or more.

6. The cartridge according to claim 5, wherein the unused area includes a first unused area that is provided on a winding end side of the magnetic recording medium, and a second unused area that is provided on a winding start side of the magnetic recording medium.

7. The cartridge according to claim 5, wherein the five or more servo bands include information for uniquely identifying each of the servo bands.

8. The cartridge according to claim 5, wherein the magnetic recording medium has a magnetic layer, and wherein the squareness ratio of the magnetic layer in a vertical direction is 65% or more.

9. The cartridge according to claim 8, wherein the magnetic layer contains a magnetic powder, and wherein the magnetic powder contains hexagonal ferrite, ε-iron oxide or Co-containing spinel ferrite.

* * * * *